US011014043B2

(12) United States Patent
Heidel et al.

(10) Patent No.: US 11,014,043 B2
(45) Date of Patent: May 25, 2021

(54) CAPTURING CARBON DIOXIDE

(71) Applicant: Carbon Engineering Ltd., Squamish BC (CA)

(72) Inventors: Kenton Robert Heidel, Calgary (CA); Geoffrey James Holmes, Calgary (CA); David W. Keith, Canmore (CA)

(73) Assignee: Carbon Engineering Ltd., Squamish BC (CA)

( * ) Notice: Subject to any disclaimer, the term of this patent is extended or adjusted under 35 U.S.C. 154(b) by 0 days.

(21) Appl. No.: 16/514,443

(22) Filed: Jul. 17, 2019

(65) Prior Publication Data
US 2019/0344217 A1 Nov. 14, 2019

Related U.S. Application Data

(62) Division of application No. 15/622,883, filed on Jun. 14, 2017, now Pat. No. 10,421,039.

(Continued)

(51) Int. Cl.
*B01F 3/04* (2006.01)
*B01D 47/00* (2006.01)
(Continued)

(52) U.S. Cl.
CPC ............ *B01D 53/62* (2013.01); *B01D 47/14* (2013.01); *B01D 53/18* (2013.01); *B01D 53/77* (2013.01); *B01D 53/78* (2013.01); *B01D 53/96* (2013.01); *B01F 3/04* (2013.01); *F28C 1/003* (2013.01); *F28C 1/04* (2013.01); *F28F 25/02* (2013.01); *F28F 25/06* (2013.01); *F28F 25/10* (2013.01);
(Continued)

(58) Field of Classification Search
CPC . B01F 3/04; B01D 47/14; B01D 53/62; F28C 1/003; F28C 1/04
See application file for complete search history.

(56) References Cited

U.S. PATENT DOCUMENTS 3,748,832 A * 7/1973 Furlong ................... F28C 1/04
96/356
4,000,264 A 12/1976 Nagano et al.
(Continued)

FOREIGN PATENT DOCUMENTS

CA 2734786 11/2017
CN 101091864 12/2007
(Continued)

OTHER PUBLICATIONS

International Preliminary Report on Patentability and Written Opinion of the International Searching Authorty from International Application No. PCT/US2009/047999, dated Dec. 21, 2010, 6 pages.

(Continued)

*Primary Examiner* — Robert A Hopkins
(74) *Attorney, Agent, or Firm* — Fish & Richardson P.C.

(57) ABSTRACT

Techniques for drift elimination in a liquid-gas contactor system include configuring a pre-fabricated mechanical frame coupled to a drift eliminator material to produce a framed drift eliminator assembly with substantially no air gaps between the drift eliminator material and the pre-fabricated mechanical frame, and coupling the framed drift eliminator assembly to the liquid-gas contactor system.

22 Claims, 12 Drawing Sheets

Related U.S. Application Data

(60) Provisional application No. 62/349,883, filed on Jun. 14, 2016.

(51) Int. Cl.
| | | |
|---|---|---|
| B01D 53/00 | (2006.01) | |
| F28C 1/00 | (2006.01) | |
| B01D 53/62 | (2006.01) | |
| B01D 53/77 | (2006.01) | |
| B01D 47/14 | (2006.01) | |
| B01D 53/18 | (2006.01) | |
| B01D 53/78 | (2006.01) | |
| B01D 53/96 | (2006.01) | |
| F28F 25/02 | (2006.01) | |
| F28F 25/06 | (2006.01) | |
| F28F 25/10 | (2006.01) | |
| F28C 1/04 | (2006.01) | |

(52) U.S. Cl.
CPC .. *B01D 2251/304* (2013.01); *B01D 2251/306* (2013.01); *B01D 2251/404* (2013.01); *B01D 2251/604* (2013.01); *B01D 2252/103* (2013.01); *B01D 2257/504* (2013.01); *B01D 2258/0233* (2013.01); *B01D 2258/0283* (2013.01); *B01D 2258/06* (2013.01); *Y02A 50/20* (2018.01); *Y02C 20/40* (2020.08)

(56) References Cited

U.S. PATENT DOCUMENTS

| | | | |
|---|---|---|---|
| 4,031,180 A | 6/1977 | Bohanon | |
| 4,049,399 A | 9/1977 | Teller | |
| 4,183,901 A | 1/1980 | Ilardi et al. | |
| 4,251,494 A | 2/1981 | Say | |
| 4,344,650 A | 8/1982 | Pinsky et al. | |
| 4,401,635 A | 8/1983 | Frint | |
| 4,632,760 A | 12/1986 | Hanson et al. | |
| 4,676,934 A | 6/1987 | Seah | |
| 4,994,210 A | 2/1991 | Lucero et al. | |
| 5,283,054 A | 2/1994 | Copenhafer et al. | |
| 5,364,604 A | 11/1994 | Spink et al. | |
| 5,582,683 A | 12/1996 | Bonsu et al. | |
| 5,679,131 A | 10/1997 | Obushenko | |
| 5,695,548 A | 12/1997 | Truta | |
| 5,879,434 A | 3/1999 | Kiss | |
| 6,409,157 B1 | 6/2002 | Lundin | |
| 6,428,759 B1 | 8/2002 | Smith et al. | |
| 6,582,498 B1 | 6/2003 | Sass et al. | |
| 6,840,987 B1 | 1/2005 | Gonzalez et al. | |
| 7,214,290 B2 | 5/2007 | Duesel, Jr. et al. | |
| 7,297,182 B2 | 11/2007 | Ray et al. | |
| 7,314,847 B1 | 1/2008 | Siriwardare | |
| 7,318,857 B2 | 1/2008 | Ray et al. | |
| 7,329,298 B1 | 2/2008 | Hasinski | |
| 7,731,781 B2 | 6/2010 | Berry et al. | |
| 7,833,010 B2 | 11/2010 | Baker et al. | |
| 7,906,089 B2 | 3/2011 | Gosh et al. | |
| 8,119,091 B2 | 2/2012 | Keith et al. | |
| 8,273,158 B2 * | 9/2012 | Jarrier | B01D 46/003 |
| | | | 95/267 |
| 8,574,354 B2 | 11/2013 | Keith et al. | |
| 9,095,813 B2 | 8/2015 | Keith et al. | |
| 9,550,142 B2 | 1/2017 | Roestenberg et al. | |
| 9,751,039 B2 | 9/2017 | Gebald et al. | |
| 2003/0056648 A1 | 3/2003 | Fornai | |
| 2003/0205039 A1 | 11/2003 | Terlson | |
| 2004/0094037 A1 | 5/2004 | Maleeny et al. | |
| 2006/0000196 A1 | 1/2006 | Beier et al. | |
| 2006/0051274 A1 | 3/2006 | Wright et al. | |
| 2006/0186562 A1 | 8/2006 | Wright et al. | |
| 2007/0157806 A1 | 7/2007 | Cash | |
| 2008/0011161 A1 | 1/2008 | Finkenrath et al. | |
| 2008/0031801 A1 | 2/2008 | Lackner et al. | |
| 2008/0138265 A1 | 6/2008 | Lackner et al. | |
| 2009/0053040 A1 * | 2/2009 | Chillar | F02C 3/305 |
| | | | 415/116 |
| 2015/0336044 A1 | 11/2015 | Keith et al. | |
| 2016/0303513 A1 | 10/2016 | Bijl et al. | |
| 2017/0203249 A1 | 7/2017 | Gebald et al. | |
| 2017/0246588 A1 | 8/2017 | Roestenberg et al. | |
| 2017/0354925 A1 | 12/2017 | Heidel | |

FOREIGN PATENT DOCUMENTS

| | | |
|---|---|---|
| CN | 101128248 A | 2/2008 |
| CN | 102202766 A | 9/2011 |
| CN | 106621705 A | 5/2017 |
| EP | 2321034 | 5/2011 |
| EP | 2782657 B1 | 12/2016 |
| IN | 2007CN00704 | 8/2007 |
| IN | 1814/CHENP/2011 | 12/2011 |
| MX | 299407 | 5/2012 |
| WO | WO 2006/009600 | 1/2006 |
| WO | WO 2006034339 | 3/2006 |
| WO | WO 2006/084008 | 8/2006 |
| WO | WO 2007/075399 | 7/2007 |
| WO | WO 2008042919 | 4/2008 |
| WO | WO 2010/022339 | 2/2010 |
| WO | WO 2017/009241 | 1/2017 |
| WO | WO 2017/148782 | 9/2017 |

OTHER PUBLICATIONS

International Preliminary Report on Patentability and Written Opinion of the International Searching Authority from International Application No. PCT/US2009/054626, dated Feb. 22, 2011, 6 pages.

International Search Report and Written Opinion of the International Searching Authority, PCT Application Serial No. PCT/US2009/0054626, dated Apr. 5, 2010, 11 pp.

International Search Report and Written Opinion of the International Searching Authority, PCT Application Serial No. PCT/US2009/047999, dated Jan. 29, 2010, 11 pp.

Baciocchi et al., "Process design and energy requirement for the capture of carbon dioxide from air," Chem. Eng. Proc., 2006, 45:1047-1058.

Canadell et al., "Contributions to accelerating atmospheric CO2 growth from economic activity, carbon intensity, and efficiency of natural sinks," Proc. Natl. Acad. Sci. USA, 2007, 104(47):18866-18870.

Chen and van Heiningen, "Kinetics of the direct causticizing reaction between sodium carbonate and titanium dioxide or sodium tri-titanate," J. Pulp Paper Sci., 2006, 32(4):245-251.

Covey, "Development of the direct alkali recovery system and potential application," Pulp Pap Canada, 1982, 83(12):T350-T354.

Hoddenbagh et al., "Borate causticizing: a cost effective technology," Pulp Pap. Canada, 2002, 103(11):T283-T289.

Kiiskilä, "Recovery of sodium hydroxide from alkaline pulping liquors by smelt causticizing, Part II Recations between sodium carbonate and titanium dioxide," Paperi ja Puu, Papper och Trä, 1979, 5:394-401.

Kiiskilä, "Recovery of sodium hydroxide from alkaline pulping liquors by smelt causticizing, Part III. Alkali distribution in titanium dioxide causticizing," Paperi ja Puu, Papper och Tä, 1979, 6:453-464.

Lackner et al., "Carbon dioxide from air," 24th Annual Technical Conference on Coal Utilization, 1999, Clearwater, FL, 12 pages.

Maddern, "Mill-scale development of the DARS direct causticization process," Pulp Pap Candada, 1986, 87(10):T395-T399.

Mahmoudkhani and Keith, "Low-energy sodium hydroxide recovery for CO2 capture from atmospheric air-Thermodynamic analysis," Int. J. Greenhouse Gas Control, 2009, 3:376-384.

Mahmoudkhani et al. "Low energy packed tower and caustic recovery for direct capture of CO2 from air," Energy Procedia, 2009, 1:1535-1542.

(56) References Cited

OTHER PUBLICATIONS

Nohlgren et al., "Model study of the direct causticization reaction between sodium trititanate and sodium carbonate," The Canadian Journal of Chemical Engineering, Jun. 2000, vol. 78, pp. 529-539.
Nohlgren, "Recovery of kraft black liquor with direct causticization using titanates," Ph.D. Thesis, Lulea University of Technology, Lulea, Sweden, 2002, 164 pages.
Palm and Theliander, "Kinetic study of the direct causticization reaction involving titanates and titanium dioxide," Chem. Eng. J., 1997, 68:87-94.
Sinquefield et al., "Borate auto-causticization for low and high temperature black liquor gasification," International Chemical Recovery Conference, Jun. 6-10, 2004, Charleston, SC, 6 pages.
Spector and Dodge, "Removal of carbon dioxide from atmospheric air," Trans. Am. Inst. Chem. Eng., 1946, 42:827-848.
Stolaroff et al., "Carbon dioxide capture from atmospheric air using sodium hydroxide spray," Environ. Sci. Technol., 2008, 42:2728-2735.
Tepe and Dodge, "Absorption of carbon dioxide by sodium hydroxide solutions in a packed column," Trans. Am. Inst. Chem. Eng., 1943, 39:255-276.
Yusuf and Cameron, "Decarbonization reactions between sodium metaborate and sodium carbonate," Ind. Eng. Chem. Res., 2004, 43:8148-8154.
Zeman and Lackner, "Capturing carbon dioxide directly from the atmosphere," World Resource Review, 2004, 16(2):157-172.
Zeman, "Direct Extraction of CO2 from Air, a Fixed Solution for a Mobile Problem," The First Regional Symposium on Carbon Management, May 23, 2006, Dhahran, Saudi Arabia, 12 pages.
Zeman, "Energy and material balance of CO2 capture from ambient air," Environ. Sci. Technol., 2007, 41(21):7558-7563.
Zeng and van Heiningen, "Pilot fluidized-bed testing of kraft black liquor gasification and its direct causticization with TiO2," J. Pulp Paper Sci., 1997, 23(11):J511-J516.
Zeng et al., "A Mathematic Model for Direct Causticization of Na2C03 with Ti02 in a Semi-batch Reactor," The Canadian Journal of Chemical Engineering, Oct. 2002, vol. 80, pp. 948-953.
Zou, "Recovery of kraft black liquor including direct causticization," Ph.D. Thesis, McGill University, Montreal, Quebec, 1991, 231 pages.
European Search Report, Application No. 09767848.6, dated Feb. 17, 2012, 7 pages.
Variable Flow Over Cooling Towers for Energy Savings, Connecticut ASHRAE Chapter, Nov. 2016, retrieved from the Internet: URL<http://ctashrae.org/downloads/Meeting_Presentations/variable_flow_presentation_connecticut_ashrae.pdf > 46 pgs.
Marley, Variflow nozzle cup, SPX Cooling Technologies, Inc., SP-VF, Dec. 2016, 2 pgs.
Kutare, Examination Report, Indian Application No. 1814/CHENP/2011, dated Apr. 13, 2018, 6 pages.
Chinese First Office Action, Application No. 201610825390.5, dated Nov. 1, 2018, 13 pages.
Chinese Decision on Rejection, Application No. 200980137997.2, dated Mar. 12, 2014, 22 pages.
Chinese First Office Action, Application No. 200980137997.2, dated Jan. 28, 2013, 13 pages.
Chinese Second Office Action, Application No. 200980137997.2, dated Aug. 26, 2013, 26 pages.
European Office Action, Application No. 09808878.4, dated Dec. 20, 2012, 5 pages.
Non-Final Office Action dated Aug. 2, 2013 mailed from USPTO for U.S. Appl. No. 12/545,579, 16 pages.
Non-Final Office Action dated Jan. 6, 2011 mailed from USPTO for U.S. Appl. No. 12/488,230, 14 pages.
Non-Final Office Action dated May 17, 2011 mailed from USPTO for U.S. Appl. No. 12/545,579, 16 pages.
Restriction Requirement dated Mar. 11, 2011 mailed from USPTO for U.S. Appl. No. 12/545,579, 8 pages.
Supplementary European Search Report, Application No. 09808878.4, dated Oct. 25, 2012, 4 pages.

\* cited by examiner

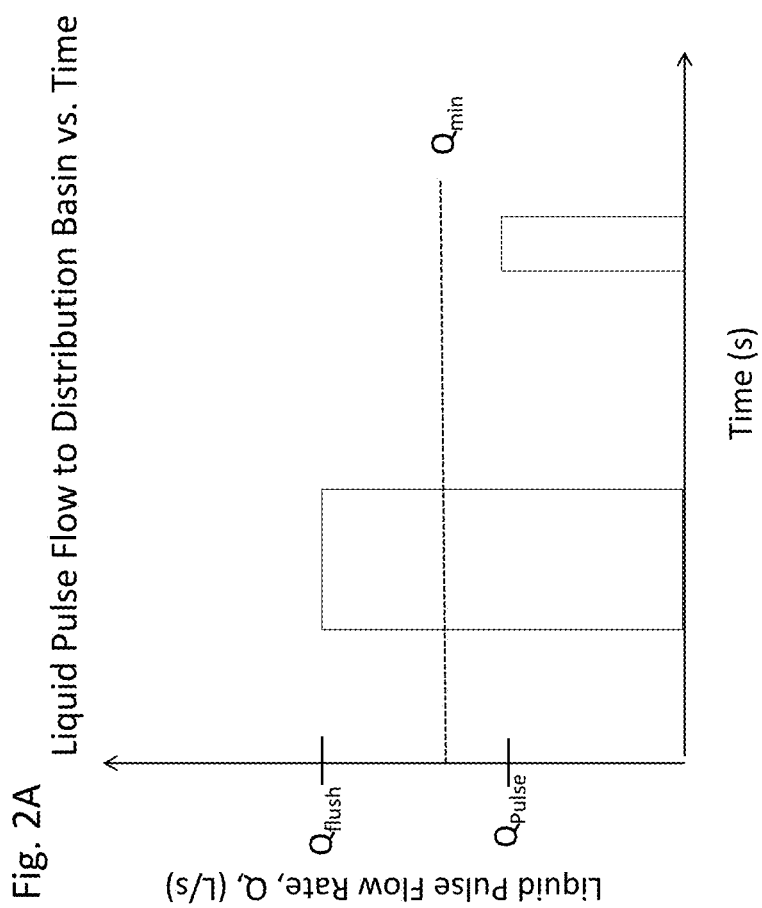

Fig. 6 Elevation View

Fig. 7 Plan View

Fig. 8 Elevation View

Fig. 9 Plan View

CAPTURING CARBON DIOXIDE

CROSS-REFERENCE TO RELATED APPLICATIONS

This application is a divisional application of and claims priority to U.S. application Ser. No. 15/622,883, filed on Jun. 14, 2017, which claims priority to U.S. patent application Ser. No. 62/349,883, entitled "Capturing Carbon Dioxide" and filed on Jun. 14, 2016, the entire contents of which are incorporated by reference herein.

TECHNICAL FIELD

This disclosure describes systems, apparatus, and methods for gas-liquid contacting for the recovery of carbon dioxide from gases.

BACKGROUND

Gas-liquid contact systems include systems used for capture of carbon dioxide ($CO_2$) from concentrated (for example, point source) gas streams, such as $CO_2$ produced from industrial sources (for example, power plants, concrete plants, flue stacks), as well as $CO_2$ captured directly from dilute sources, for example ambient air.

SUMMARY

In an example implementation, a method for distributing a liquid in a liquid-gas system includes flowing a liquid into a system of nozzles and basin of the liquid-gas contacting system; and operating the nozzles and basin system with a distribution sub-assembly configured to operate the nozzles under a plurality of liquid flow rates and maintaining a consistent spatial liquid distribution of the liquid within the distribution sub-assembly at the plurality of liquid flow rates.

In an aspect combinable with the example implementation, the distribution sub-assembly includes a first portion of nozzles having a first intake height and a second portion of nozzles having a second intake height shorter than the first intake height.

In another aspect combinable with any of the previous aspects, the nozzle and basin system configured to hold a plurality of liquid levels and at least a portion of the first portion of nozzles and the second portion of nozzles activate within the plurality of liquid levels.

In another aspect combinable with any of the previous aspects, the first portion of nozzles and the second portion of nozzles are distributed within the basin.

In another aspect combinable with any of the previous aspects, the first portion of nozzles are paired with the second portion of nozzles and the pairs are distributed within the basin.

In another aspect combinable with any of the previous aspects, the first portion of nozzles are distributed within a center portion of the basin and the second portion of nozzles are distributed evenly within the basin.

In another aspect combinable with any of the previous aspects, the first portion of nozzles are distributed within a portion of the basin furthest from the liquid inlet of the basin.

In another aspect combinable with any of the previous aspects, the plurality of liquid flow rates includes at least one of a flush flow rate or a pulse flow rate, and the flush flow rate produces a particular liquid level that activates at least the first portion of nozzles, and the pulse flow produces another particular liquid level that activates at least the second portion of nozzles.

In another aspect combinable with any of the previous aspects, flowing the liquid through at least some of the first portion of nozzles or second portion of nozzles, and flowing the liquid from the nozzles to a portion of packing material of the liquid-gas contactor system of up to about 7 litres per second per square meter of packing material.

In another aspect combinable with any of the previous aspects, the pulse flow is 10 percent of the flush flow.

In another aspect combinable with any of the previous aspects, at least a portion of the first and second nozzles are configured to activate within the plurality of liquid flow rates to produce overlapping spray cones.

In another aspect combinable with any of the previous aspects, the method for gas-liquid contacting includes capturing $CO_2$ from at least one of a dilute gas source or point source with the liquid-gas contactor system.

In another aspect combinable with any of the previous aspects, the dilute gas source includes air, and the point source includes at least one of flue gas, reservoir gas, exhaust flue stack gases from power generation processes, exhaust flue stack gases from concrete production processes, or exhaust from combustion processes.

In another aspect combinable with any of the previous aspects, the liquid-gas contacting system is operated as part of a cooling water system.

In another example implementation, a method of solids separation in a liquid-gas contacting system includes operating a basin collection system fluidly coupled to a mechanical removal system and at least one solid collection zone, flowing a mixed stream of liquids and solids into the basin collection system of the liquid-gas contacting system, and collecting and processing the solids from the mixed stream with the mechanical removal system and the at least one solid collection zone.

In an aspect combinable with the example implementation, the mechanical removal system includes at least one of an auger, screw conveyor, progressive cavity pump, screw pump, high density solids pump, reciprocating pump.

In another aspect combinable with any of the previous aspects, the basin collection system is non-circular or rectangular in shape.

In another aspect combinable with any of the previous aspects, the basin collection system includes an inclined bottom basin area and a liquid level; and a substantial portion of the inclined bottom basin area is configured above the liquid level and sloped down towards the at least one solid collection zone.

In another aspect combinable with any of the previous aspects, further including capturing $CO_2$ from at least one of a dilute gas source or point source with the liquid-gas contactor system.

In another aspect combinable with any of the previous aspects, the dilute gas source includes air and the point source includes at least one of flue gas, reservoir gas, exhaust flue stack gases from power generation processes, exhaust flue stack gases from concrete production processes, and exhaust from combustion processes.

In another aspect combinable with any of the previous aspects, the liquid-gas contacting system is operated as part of a cooling water system.

In another example implementation of a method of drift elimination in a liquid-gas contacting system, a pre-fabricated mechanical frame is configured and coupled to a drift eliminator material to produce a combined framed drift eliminator assembly with substantially no air gaps between the drift eliminator material and mechanical frame, and coupling the pre-fabricated framed drift eliminator to the liquid-gas contacting system.

In another aspect combinable with any of the previous aspects, the framed drift eliminator assembly includes a flexible sealant coupled to the drift eliminator material.

In another aspect combinable with any of the previous aspects, the liquid-gas contactor system includes capturing $CO_2$ from at least one of a dilute gas source or point source with the liquid-gas contactor system.

In another aspect combinable with any of the previous aspects, the dilute source includes air and the point source includes one or more of flue gas, reservoir gas, exhaust flue stack gases from power generation processes, exhaust flue stack gases from concrete production processes, and exhaust from combustion processes.

In another aspect combinable with any of the previous aspects, the liquid-gas contacting system is operated as part of a cooling water system.

In another example implementation, a nozzle and basin apparatus for use in a liquid-gas contacting system includes a liquid inlet port coupled to a system of nozzles and basin, and a distribution sub-assembly coupled to the nozzle and basin system configured to operate under a plurality of liquid flow rates while maintaining consistent spatial liquid distribution.

In an aspect combinable with the example implementation, the distribution sub-assembly includes a first portion of nozzles having a first intake height and a second portion of nozzles having a second intake height shorter than the first intake height.

In another aspect combinable with any of the previous aspects, the nozzle and basin system is configured to accommodate a plurality of liquid levels.

In another aspect combinable with any of the previous aspects, the first portion of nozzles and the second portion of nozzles are distributed within the basin.

In another aspect combinable with any of the previous aspects, the first portion of nozzles are paired with the second portion of nozzles and the pairs are distributed as sets within the basin.

In another aspect combinable with any of the previous aspects, the first portion of nozzles are distributed within a center portion of the basin and the second portion of nozzles are evenly distributed within the basin.

In another aspect combinable with any of the previous aspects, the first portion of nozzles distributed within the portion of the basin located opposite to a liquid inlet port.

In another aspect combinable with any of the previous aspects, the plurality of liquid flow rates includes at least one of a flush flow rate or a pulse flow rate, and at least the first portion of nozzles are configured to activate during the flush flow rate, and at least the second portion of nozzles are configured to activate during the pulse flow rate.

In another aspect combinable with any of the previous aspects, the distribution sub-assembly is fluidly coupled to at least a portion of packing material of the liquid-gas contactor system, and at least a portion of the first and second nozzles configured to distribute a liquid flow to the packing material of up to 7 litres per second per square meter of packing material.

In another aspect combinable with any of the previous aspects, pulse flow rates are 10 percent of flush flow rates.

In another aspect combinable with any of the previous aspects, the distribution sub-assembly includes a first quantity of the first portion of nozzles and a second quantity of the second portion of nozzles.

In another aspect combinable with any of the previous aspects, both the first and second quantities of the respective first and second portions of nozzles are evenly distributed within a complete surface area of a basin of the nozzle and basin system.

In another aspect combinable with any of the previous aspects, a center area of a basin of the nozzle and basin system includes a first density of the first portion of nozzles and a perimeter area of the basin includes a second density of the first portion of nozzles less than the first density.

In another aspect combinable with any of the previous aspects, the center area of the basin of the nozzle and basin system includes a first density of the second portion of nozzles and the perimeter area of the basin includes a second density of the second portion of nozzles greater than the first density.

In another aspect combinable with any of the previous aspects, an area of a basin of the nozzle and basin system adjacent to a liquid inlet port of the system includes a first density of the first portion of nozzles and a portion of the basin not adjacent the liquid inlet port includes a second density of the first portion of nozzles less than the first density.

In another aspect combinable with any of the previous aspects, the liquid-gas contactor is configured for capturing $CO_2$ from at least one of a dilute gas source or a point source.

In another aspect combinable with any of the previous aspects, the dilute source includes air and the point source includes one or more of flue gas, reservoir gas, exhaust flue stack gases from power generation processes, exhaust flue stack gases from concrete production processes, and exhaust from combustion processes.

In another aspect combinable with any of the previous aspects, the liquid-gas contactor system is configured as part of a cooling water system.

In another example implementation, a liquid-gas contacting apparatus includes a basin collection system fluidly coupled to at least one or more solid collection zones, and a solids transfer system coupled to the basin collection system configured to remove solid material from the at least one or more solid collection zones.

In another aspect combinable with any of the previous aspects, the solids transfer system includes at least one of an auger, screw conveyor, progressive cavity pump, screw pump, high density solids pump, reciprocating pump.

In another aspect combinable with any of the previous aspects, the basin collection system is non-circular, or rectangular in shape.

In another aspect combinable with any of the previous aspects, the basin collection system includes an inclined bottom basin area and a liquid level; and the inclined bottom basin area is sloped down towards the at least one or more collection zones.

In another aspect combinable with any of the previous aspects, the liquid-gas contactor apparatus is configured to capture $CO_2$ from one or more of a dilute gas source or a point source In another aspect combinable with any of the previous aspects, the dilute source includes air and the point source includes one or more of flue gas, reservoir gas, exhaust flue stack gases from power generation processes, exhaust flue stack gases from concrete production processes, and exhaust from combustion processes.

In another aspect combinable with any of the previous aspects, the liquid-gas contacting system is operated as part of a cooling water system.

In another example implementation, the liquid-gas contacting apparatus includes a pre-fabricated mechanical frame and drift eliminator material coupled to the pre-fabricated mechanical frame to form a framed drift eliminator assembly.

In another aspect combinable with any of the previous aspects, the framed drift eliminator assembly includes flexible sealant pressed against the drift eliminator material configured for substantially no air gaps.

In another aspect combinable with any of the previous aspects, the liquid-gas contacting apparatus is configured for capturing $CO_2$ from one or more of a dilute source or point source.

In another aspect combinable with any of the previous aspects, the dilute source includes air and the point source includes one or more of flue gas, reservoir gas, exhaust flue stack gases from power production equipment, exhaust flue stack gases from concrete production equipment, and exhaust from combustion equipment.

In another aspect combinable with any of the previous aspects, the liquid-gas contacting system is operated as part of a cooling water system.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a graph illustrating the liquid-gas contactor system flush flow and pulse flow rates versus time.

DETAILED DESCRIPTION

Figure 1:
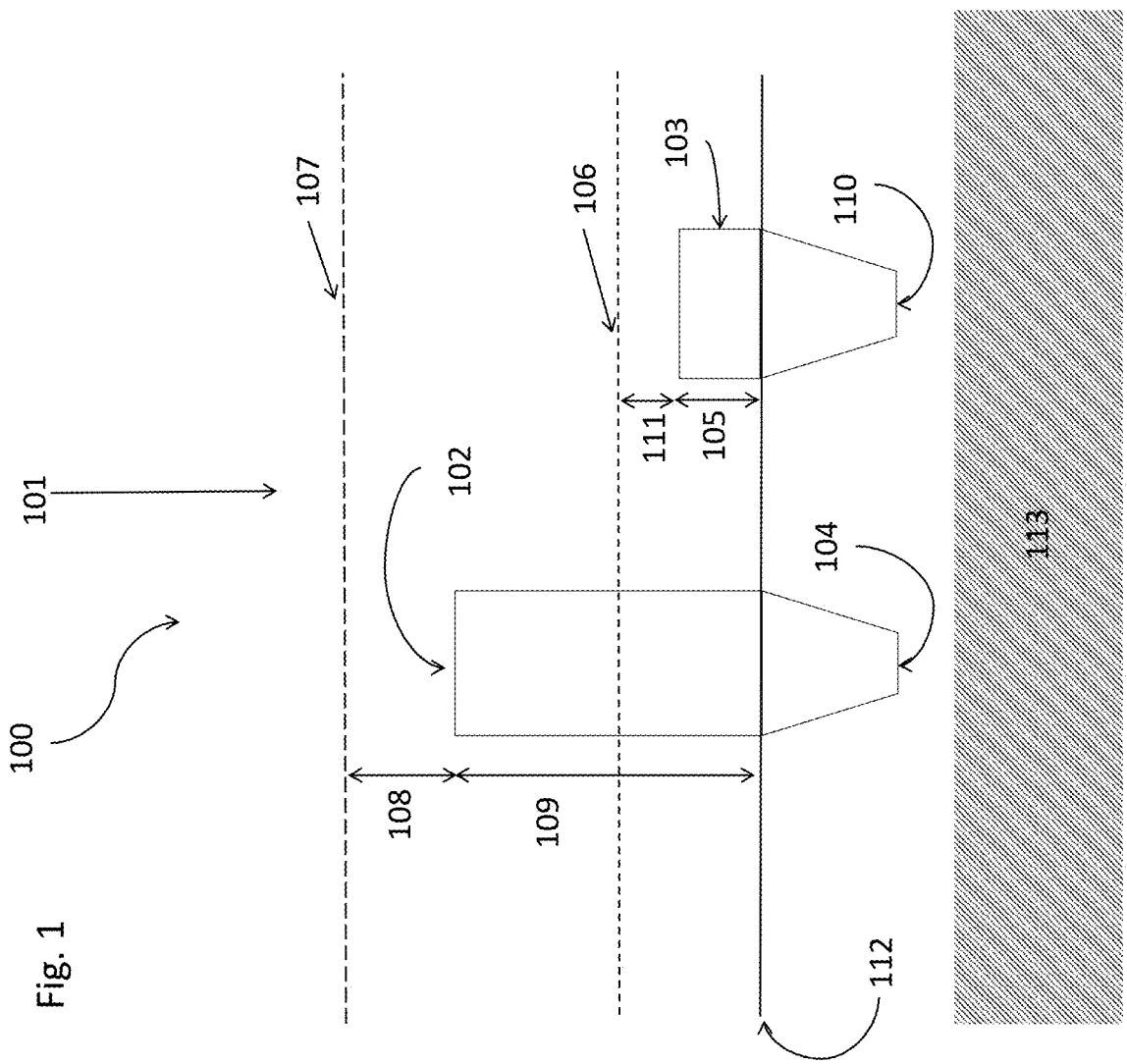
FIG. 1 depicts an illustrative nozzle and basin system for distribution of liquid flow through both pulse and flush flow regimes of a liquid-gas contactor system.

A number of innovations to existing cooling tower components are needed to tailor them, and the system overall, to improve the safety, performance, and cost of application in a liquid-gas contactor system for $CO_2$ capture. The $CO_2$ capture may apply to point sources, for example flue exhaust gas from combustion equipment, flue exhaust gas from power plants or cement plants and the like, and also to dilute sources, for example atmospheric $CO_2$. These innovations may also improve performance for cooling water applications.

A set of nozzles and basins is described, with desirable features that accommodate a large range of liquid flow rates while maintaining consistent spatial liquid distribution.

A basin configuration is described, that promotes liquid collection and flow patterns within, such that suspended solids are able to settle out and migrate to one or more collection zones for removal.

Embodiments of a mechanical frame containing drift eliminator material are described, wherein the frame's shape and method of installation prevents air bypass around the drift eliminator material.

Multiple configurations of sealing are described, wherein the sealant location and method of application prevents air bypass around the drift eliminator material.

The features described here offer technical and commercial advantages above what the existing systems and methods provide. For example, conventional nozzle and basin systems are based on liquid distribution nozzles used in the hot water basin of cooling towers or the distribution basin of crossflow air contactors. Normally these nozzles are all similar in geometry and are all inserted into holes in a basin mounted above the packing material or are part of splash bars. When fluid is fed into the top basin, the fluid flows through the entire basin and builds up a liquid static head, which in turn supplies the pressure required to drive the fluid through the nozzles and generate the spray cone pattern. The liquid depth in these basins is generally quite low, for example they may be on the order of 10 to 30 centimeters. These nozzles have a certain range of liquid static head, across which they can produce an acceptable spray pattern. They are designed to operate at a single fixed flow rate of liquid to the basin. If operated at a lower flow rate, these existing systems will not build up the appropriate static head, which will not produce a full "nozzle spray cone" and as a result, they distribute liquid over a smaller area directly below the nozzle, leaving under-wetted zones of packing material in between nozzles. The issue of under-wetted packing also occurs when the liquid flow to the basin is further reduced such that some areas of nozzles located far from the liquid entry point do not receive any fluid. While under-wetted packing material may somewhat reduce performance in cooling towers due to the impact on heat exchange between air and liquid, it has other challenges when present in carbon dioxide capture facilities. Under-wetted zones in packing material do not capture $CO_2$ as well as properly wetted packing material zones. Implementations of a nozzle and basin system disclosed here resolves the under-wetted problem by configuring the nozzle and basin system such that only some of the nozzles are active at low liquid levels (and the associated static head) in the basin, which correspond to low flow to the basin, and other nozzles activate at higher liquid levels (and associated higher static head) in the basin, corresponding to high flow to the basin. This way, at low flow, each active nozzle distributes a higher flow rate than if all nozzles were active, enabling them to produce a full spray cone, and to cumulatively supply liquid to the entire top surface area (footprint) of the packing under all flow conditions. This configuration delivers liquid flow evenly, produces even spatial liquid distribution below the basin, and as a result, provides better wetting of the packing surface which in turn allows for greater overall $CO_2$ capture from the gas that makes contact with the liquid. Consistent spatial liquid distribution, in some aspects, may occur where even distribution of liquid across the packing surface area, or square footage, is achieved.

As another example, if the process solution contains particulates or fines, and it flows over the gas-liquid contactor packing, the contactor packing itself will work to disperse the fines over the entire area of the liquid collection basin located in an area underneath the packing material. As the liquid drops fall out of the bottom of the packing, the solids they contain may settle onto the liquid collection basin floor when the liquid flow is not sufficient to suspend and carry the fines along the basin to the suction of the liquid discharge pump. Thus the liquid collection basin could act similar to a solids settling tank. The liquid collection basin's large inclined section, located above liquid level, facilitates build-up of the solid layer. As drops fall and hit this inclined section, they cause a "splash." On a perfectly horizontal surface this splash would cause the solids to jostle from one place to another with no net movement in one single direction over long periods of time. But with an inclined section as described in example implementations in the present disclosure, the force of the droplet hitting the inclined surface washes the solids down the incline. This is due in part to the force of the droplet hitting the surface, as well as the force of gravity pulling more solids in the downward direction. Thus, even with very small inclines, the solids will move toward the lower end of the surface and eventually discharge into a sump area where they may be removed, for example, with mechanical solids removal equipment including but not limited to an auger, screw conveyor, progressive cavity pump, screw pump, high density solids pump, or reciprocating pump, and the clarified liquid may also be withdrawn from the contactor liquid collection basin.

In another example, the drift eliminator installation and housing described in implementations of the present disclosure may allow standard drift eliminators to be mounted in a precisely machined frame before the overall frame is installed on the air contactor or cooling tower structure. For example, this frame may be pre-fabricated at a shop, and then the frame may be shipped to the location of the cooling tower or air contactor. By installing the drift eliminator sheets into a precisely machined frame, a tighter seal may be attained between sheets and within the frame itself. The frame is then designed to be installed in the field, and fit over the walls that enclose the outlet of the gas-liquid contactor. This installation method in combination with the design of the frame to "fit over" the structure outlet, allows a tight, consistent seal of the drift eliminator perimeter to the outflow gas and allows higher performance control of drift.

In another example, drift eliminator installation and housing may be improved in some applications by installing and sealing the drift eliminator material around the area immediately upstream of the fan housing. This method of installing and housing drift eliminator material can be applied to configurations such as dual, or single cross flow induced fan systems, where the area immediately upstream of the fan cowling can be covered with drift eliminator material, and the drift eliminator material can be supported and sealed such that any air moving through the packing material cannot leave the system without first moving through the drift eliminator material. In these induced fan systems, the pressure gradient between the system and the outside environment is such that gas will always leak into the system rather than out of the system, which also aids in preventing escape of liquid aerosols, also known as drift, from the system.

In another example, the drift eliminator material is positioned between the packing material and gas outlet, where the drift eliminator material may be physically attached to the packing material and sealant is then additionally applied around the perimeter of the drift eliminator material, sealing outer edges of the material to the outer housing of the gas contactor. Sealing the drift eliminator material to the housing walls in this way provides a desirable seal against any gaps, for example between the packing material and the housing, where gas and/or liquid may be able to move, that could allow for air entrained with liquid to bypass the drift eliminator material.

These modifications to the drift eliminator fabrication, installment and housing/sealing may provide technical and commercial improvements to the $CO_2$ capture method/device, because the system includes chemicals that must be contained within the contactor with higher thresholds of containment than those applied to cooling water systems; therefore, these embodiments are useful in the dilute source $CO_2$ capture field. In some aspects these stringent methods of fabrication may not be necessary for industrial cooling units from a drift perspective, however, these designs and methods may be more economical than the current method of installing drift eliminators into cooling towers in the field.

Each of the configurations described later may include process streams (also called "streams") within a system for capturing carbon dioxide from gaseous sources, including dilute sources such as the atmosphere. The process streams can be flowed using one or more flow control systems implemented throughout the system. A flow control system can include one or more flow pumps to pump the process streams, one or more fans or blowers to move gaseous process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the system for converting calcium oxide to calcium hydroxide, the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such implementations, the operator can manually change the flow conditions by providing inputs through the control system. Also, in such implementations, the control system can automatically (that is, without manual intervention) control one or more of the flow control systems, for example, using feedback systems connected to the control system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Referring to FIG. 1, a basin and nozzles system for distributing liquid solution over packing is described with respect to illustrative system 100. Liquid solutions include, for example, water, sodium hydroxide solution, potassium hydroxide solution, and the like. As depicted in FIG. 1, liquid stream 101 is provided to the basin and nozzles system 100. In some aspects, this stream may be provided at in an intermittent flow pattern, e.g., it may flow at a first rate that is higher than at least one second rate, to introduce pulses of flow to the basin and nozzle system. For example, stream 101 could be repeatedly switching between flowing the fluid briefly at a very high rate, followed by shutting the stream off for a duration of time, then followed by flowing the fluid briefly at a lower flow rate, and repeating versions of this cycle. In another example, stream 101 could be repeatedly switching between flowing the fluid briefly at a very high rate, followed by at least one second, lower flow rate, and cycling between these flow rates in a defined cycle over time.

In some embodiments, as a result of liquid stream 101 flowing into the basin and nozzle system 100, the fluid builds up in the basin and nozzle system 100 until it reaches a certain static head level 106 that enables flow through at least one of a first type of nozzle 103, such that nozzles 103 become active. In some aspects, nozzles 103 have an intake height 105 within the basin which could enable proper flow and a specific liquid spray cone geometry at or above the lower static liquid head associated with liquid level 106. The intake height 105 could be flush with the basin, or the intake height 105 could be some distance above the basin.

In some aspects, the exit 110 of the nozzle 103 is also designed to enable a spray cone to properly wet at least a portion of the packing material 113 located below the basin and nozzle system 100, given the static head level at or above a liquid height 106 and the associated liquid flow rate into the basin and nozzle system 100. In some embodiments, as the flow rate of fluid stream 101 increases to the basin, the liquid and static head level in the basin will rise until it reaches level 107. In some embodiments, at and above this liquid and static head level 107, the next set of nozzles, 102 become active. In some embodiments, these 102 nozzles could have a higher intake height, 109, that prevents them from activating until a higher static head level 107 is reached.

In some aspects, these 102 nozzles may also have enough liquid level above their intake height, shown as 108, to prevent syphoning of air. In some embodiments, at least one of these nozzles, 103 and 102, can be placed in certain patterns throughout the basin to accommodate how and where the stream 101 enters and fills the basin, to ensure that all nozzles are located to receive proper liquid flow and static head for operation. In some aspects, once the range of liquid flow rates to the basin are selected, the factors that must be considered to produce consistent spatial liquid distribution may include the design of nozzles 102 and 103, intake heights 105 and 109, the number of nozzles 102 and 103, and the location and concentration of nozzles 102 and 103 within the basin. For example, the nozzles 103 and 102 may be paired beside each other into a set, where the sets are distributed evenly within the basin. In another example, the nozzles 102 may be located within the central portion of the basin and the nozzles 103 may be distributed evenly within the basin, but may also have a higher concentration or number of nozzles 103 located at the perimeter of the basin.

In another example, the nozzles 102 may be located within the portion of the basin furthest from the liquid inlet of the basin. Further to this example, if the liquid inlet was located on one wall of a square or rectangular basin, the nozzles 102 might be located in a single line for example along the basin near the wall directly opposite to the wall on which the liquid inlet port was located. In all of these examples, the geometry of nozzles 102 and 103 may be the same or different. In some embodiments, there can also be several different sets of these types of nozzles 102 and 103, wherein the intake heights 105 and 109 are varied, as are the nozzle exit designs 104 and 110, to enable better wetting capabilities under the stream 101 flow rates and basin static head levels.

In some embodiments, the nozzles 102 and 103 may be of the same nozzle design, for example they may be designed with a particular geometric exit shape, or inlet diameter, to provide a proper spray cone under low flow conditions, however the number of nozzles attached to the higher intake height may be increased to correct for the higher flow case. For example, the basin could include 5 to 10 times more 102 nozzles attached to higher intake heights than 102 nozzles attached to lower intake heights, so that the combination of quantity and type of nozzles per square foot of basin footprint allow for proper flow and spatial liquid distribution to the packing at static head levels 106 or 107 and corresponding liquid flow rates into the basin.

In some embodiments, the nozzles 102 and 103 may be of different nozzle design, where the 102 nozzle design is specific to lower flow rates and the 103 nozzle design is specific to higher flow rates, and the combination of these nozzle designs and intake heights allow for proper spatial liquid distribution under the various flow rates to the nozzle and basin system 100. In some embodiments, a combination of number and type of nozzle designs attached to intake heights may provide proper spatial distribution of liquid to the packing under various liquid flow rates.

Referring to FIG. 2A, a graph illustrating how the flow of stream 101 could vary over time is shown, where a larger flush flow ($Q_{flush}$) occurs, followed by no flow, followed by a smaller pulse flow ($Q_{pulse}$). In some embodiments, this method of flowing stream 101 to the basin enables the packing material 113 to remain suitably wetted and capable of capturing $CO_2$ while significantly reducing the pumping energy requirements. The dashed red line, $Q_{min}$, illustrates a minimum flow rate, above which the 102 type of nozzles become active.

Figure 2B:
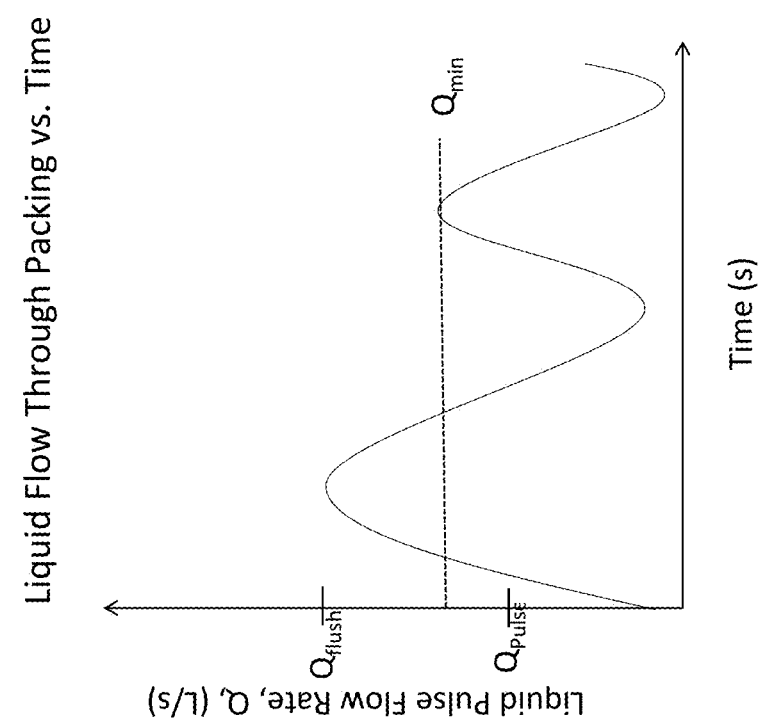
FIG. 2B is a graph illustrating liquid flow dampening effects over time for a liquid-gas contactor system with top basin liquid distribution technology.

Referring to FIG. 2B, a graph illustrating how the liquid flow through the packing material could vary over time in association with the various flow rates of stream 101 over time, where for example a larger flush flow ($Q_{flush}$) to the top basin occurs, followed by small or no flow, followed by a smaller pulse flow ($Q_{pulse}$), and this flow pattern may be repeated over time. In some aspects, this repeating pattern of varying flow rates over time may be referred to as a duty cycle, as it can be produced by cycling an upstream pressurized liquid distribution system that includes for example one or more pumps and valves to control the flow. This upstream system requires energy to cycle through the various flow patterns, and the duty cycle is selected to optimize this energy demand with $CO_2$ capture so that the overall air contactor system is optimized for both operational and capital costs. In some embodiments associated with these types of stream 101 flow patterns to the basin, the transition of liquid flow rates through the liquid distribution system and top basin and/or the packing could become less sharp as a result of the characteristic of the top basin and nozzle design.

Figure 3:
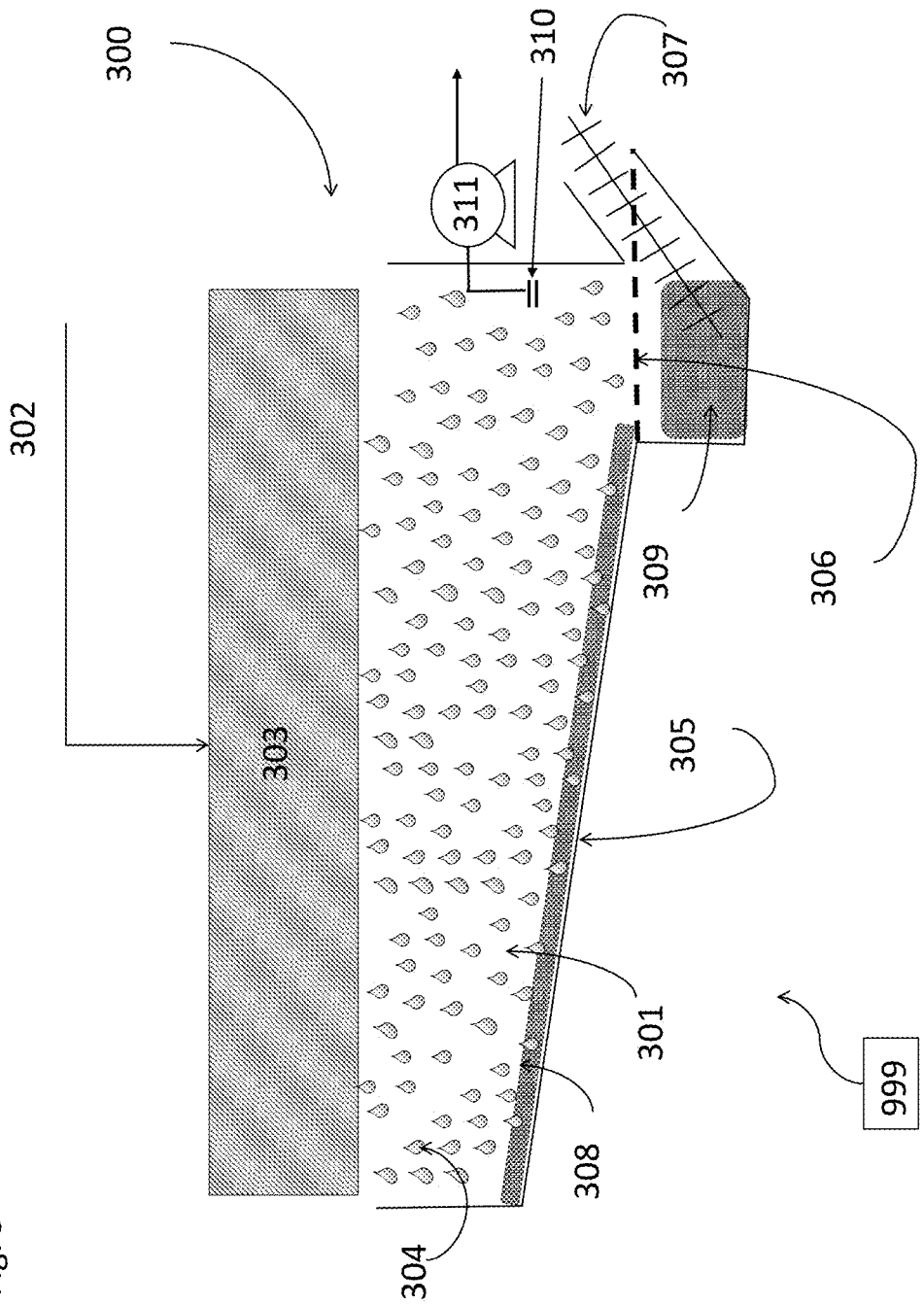
FIG. 3 depicts an illustrative collection basin and solids removal unit of a liquid-gas contactor system.

Referring to FIG. 3, a basin collection system for settling, collection and removal of solids is described with respect to illustrative system 300. The basin collection system 301 is fluidly coupled to packing material 303, an inclined bottom basin area 305, a liquid redistribution pump 311 and associated suction intake and piping 310, and a solids collection basin 309. The solids collection basin is fluidly coupled to a mechanical removal system 307. In some embodiments, liquid stream 302 may include, for example, fluids such as water, NaOH, KOH or other process solutions, and could also include suspended solids, for example, particulates captured by the liquid from the gas stream, or may include particulates entrained from upstream facilities. In some embodiments, stream 302 flows through packing material 303, is distributed and falls off the packing as small drops or trickles of liquid, 304, into the liquid collection basin system 301, where it comes into contact with an inclined bottom basin area 305. In some embodiments, some amount of particulates could be present in stream 302 and could settle out onto the inclined bottom basin area 305, in particular when the flow rate of liquid 304 across the inclined bottom basin area 305 towards the liquid redistribution pump's suction intake and piping 310 is low enough, the particulate settling velocity is high enough, and the distance to the liquid redistribution pump's suction intake and piping 310 is far enough to enable settling of the particulates out of the liquid flow before it reaches the redistribution pump's suction intake and piping 310.

In some embodiments, the basin bottom area 305 is inclined such that it remains largely above the liquid level 306 of the liquid collection basin system 301, and as a result, a solids layer 308 accumulates. In some aspects, the motion of the liquid droplets 304 as they splash onto the inclined bottom basin 305 surface is such that it displaces some of the solid layer 308 in a downward direction towards the solids collection basin(s) 309. In some embodiments the solid collection basin could contain a mechanical removal system 307 for example an auger, screw conveyor, progressive cavity pump, screw pumps, high density solids pump such as reciprocating pumps, or the like, which removes the solids material from the basin.

In some embodiments, the basin collection system 301 may be the same shape and size as the footprint of the packing material 303, for example rectangular if the packing footprint is rectangular or circular if the packing footprint is circular, to ensure proper collection of the liquid. In some embodiments, at least one of the inclined bottom basin 305 and solid collection basin(s) 309 allow for solids collection to take place in non-circular shapes of the footprint of the basin collection system 301.

In some types of commercial solids separation systems, for example clarifier settling tank designs, a circular footprint may be necessary to gain full advantage of the use of solids removal equipment such as sludge raking or suction systems, where a circular sweeping pattern can remove solids with fewer dead zones from a circular footprint than from a non-circular footprint.

Figure 4:
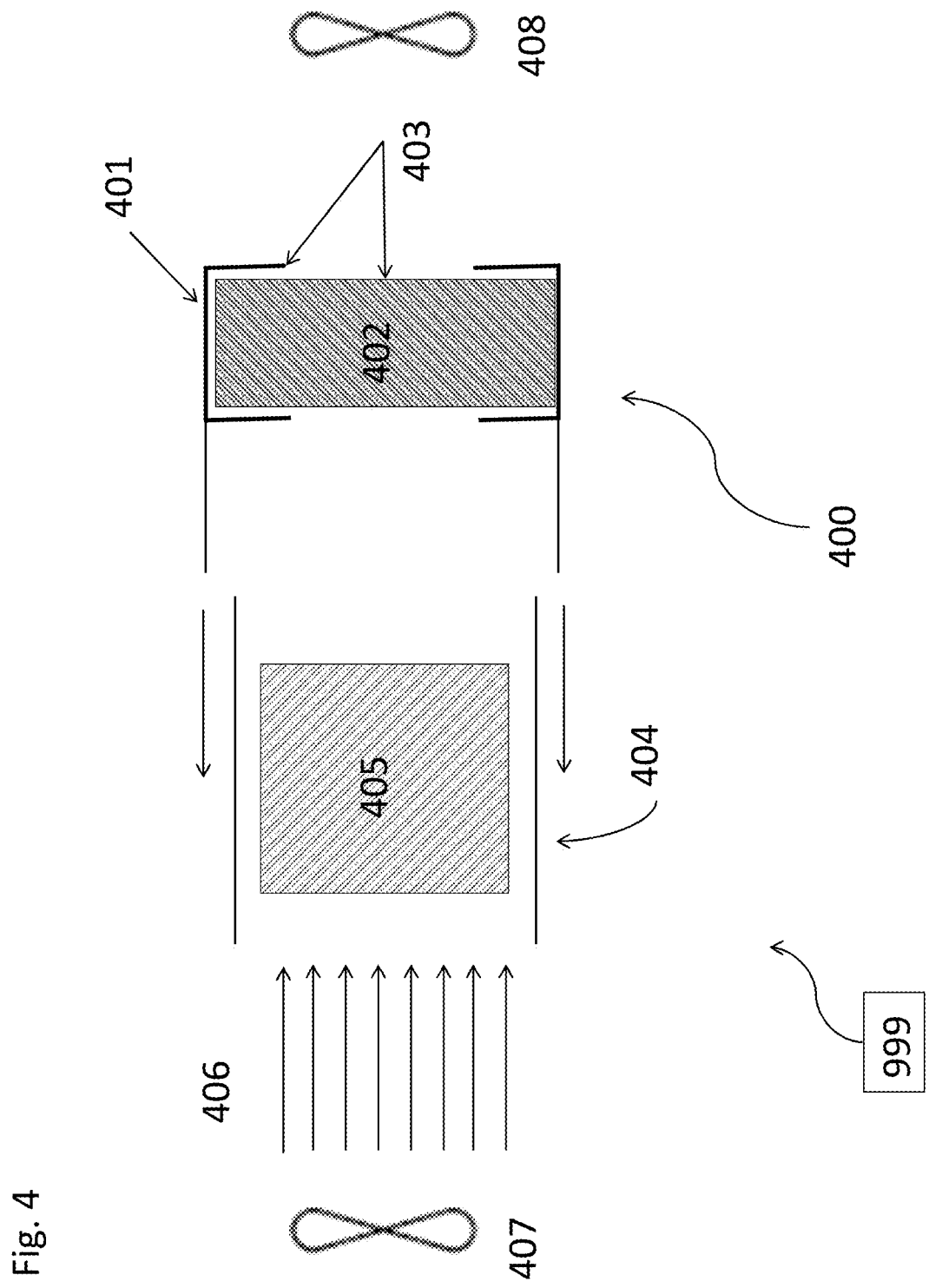
FIG. 4 depicts an illustrative structural harness and drift eliminator assembly of a liquid-gas contactor system.

FIG. 4 depicts an example precisely machined drift eliminator frame assembly system for minimizing air bypass with respect to illustrative system 400. The drift eliminator material 402 is coupled to a pre-fabricated frame assembly 401 as part of a frame and drift assembly 403, which is coupled to the air contactor structure walls 404. In some embodiments there may also be one or more fans, for example forced draft 407 or induced draft 408 fans, coupled to the air contactor system 400. The drift eliminator material 402 is pre-installed into a pre-fabricated frame assembly 401 such that the combined frame and drift assembly 403 can be easily fitted over the air contactor structured walls, 404, and placed next to the packing material 405, during, or after, install of the air contactor. In some embodiments, this framed drift eliminator assembly 403 is precisely machined and fitted together in a controlled environment, such as a fabrication shop, where the precision and fitting can be consistently executed and checked for quality, in some cases through use of an automated assembly line, before being installed on the air contactor system. In some aspects, this method of pre-fabrication of the drift eliminator assembly can lead to substantially no air gaps, and cracks between the drift eliminator material and other componentry than, for example, if all componentry was installed individually in the field. In some embodiments, this framed drift eliminator assembly 403 is pre-fabricated in a controlled, consistent and precise manner such that the airflow, 406, cannot bypass the drift eliminator material 402 by slipping through gaps or cracks. In some aspects, pre-fabricating the framed drift eliminator assembly in a controlled, consistent and precise manner means that the drift eliminator assembly is built and sealed in the essentially the same way, using essentially the same methods, under similar conditions, and inspected to the same level of quality for all applications such that each framed drift eliminator assembly conforms to a standard. This is different from, for example, installing and sealing the drift eliminator material in the field under various environmental conditions, for example freezing temperatures, snow, wind or rain, in some cases using various labour, equipment, install and inspection methods with a higher degree of variation in the formation of drift eliminator material around support structures, and a higher degree of variation in the quality of inspection, resulting in a higher degree of gaps or cracks produced, leading to the increased potential of air bypass. The air flow may be moved by a forced fan configuration, 407, where the fan is located upwind of the packing material, 405, or it may be pulled by an induced fan configuration, 408, where the fan is located downwind of the packing and drift material. In any case, the drift eliminator assembly/install/sealing embodiments disclosed here ensures that the bulk air leaving the system is ultra-low in drift content (there are substantially no air gaps) and process solution does not become air borne outside of the system.

Figure 5:
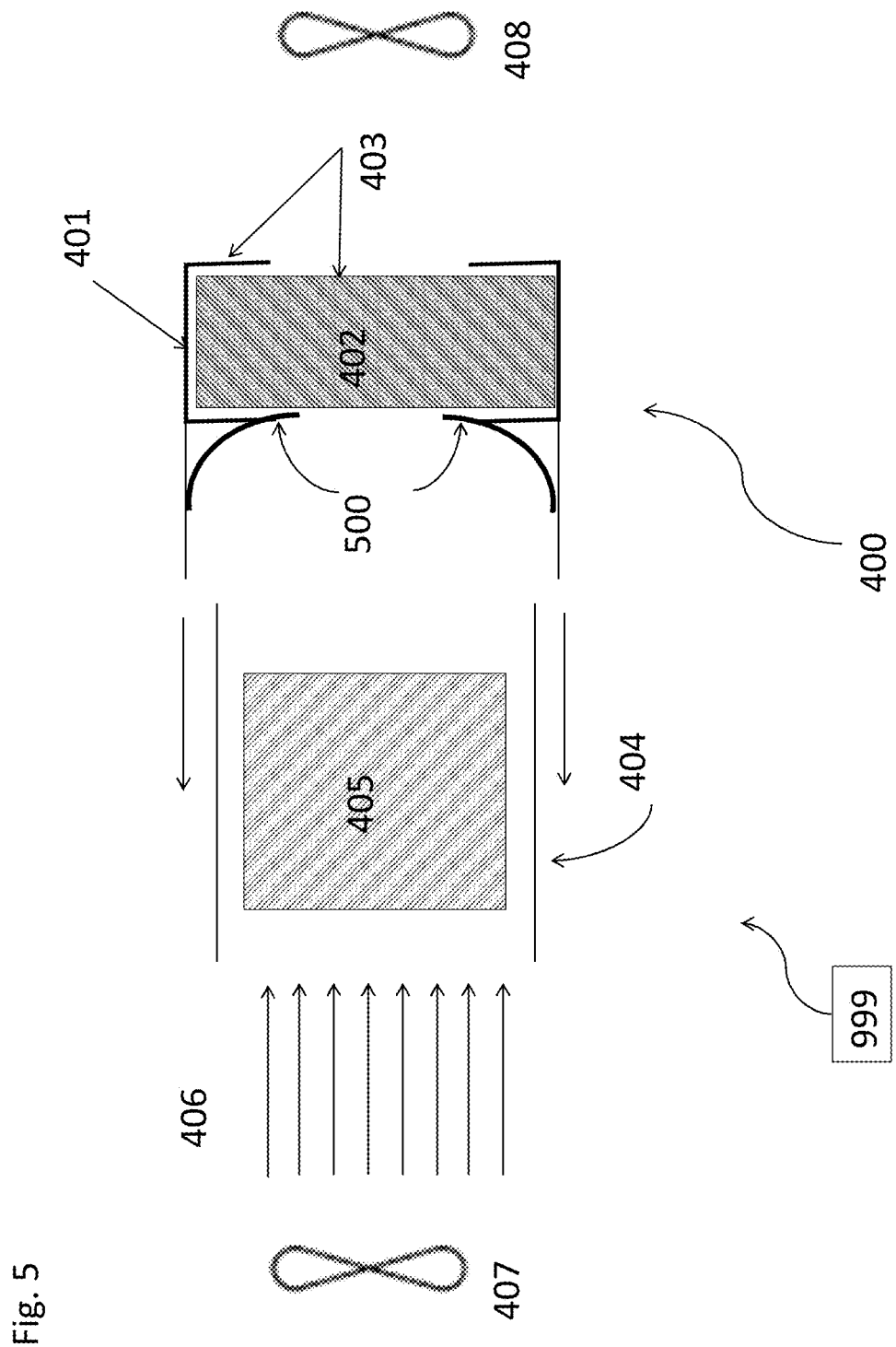
FIG. 5 depicts an illustrative structural harness and drift eliminator assembly with flexible sealant flaps of a liquid-gas contactor system.

FIG. 5 depicts an example of precisely fitted flexible seals for minimizing air bypass with respect to illustrative system 400. The drift eliminator material 402 is coupled to a pre-fabricated frame assembly 401, which is also coupled to flexible seals 500 as part of a frame and drift assembly 403, which is coupled to the air contactor structure walls 404. In some embodiments there may also be one or more fans, for example forced draft 407 or induced draft 408 fans, coupled to the air contactor system 400. The flexible seal material 500 is attached to the framed drift eliminator assembly 403 to further reduce air bypass, resulting in substantially no air gaps, around the drift eliminator material 402.

Figure 6:
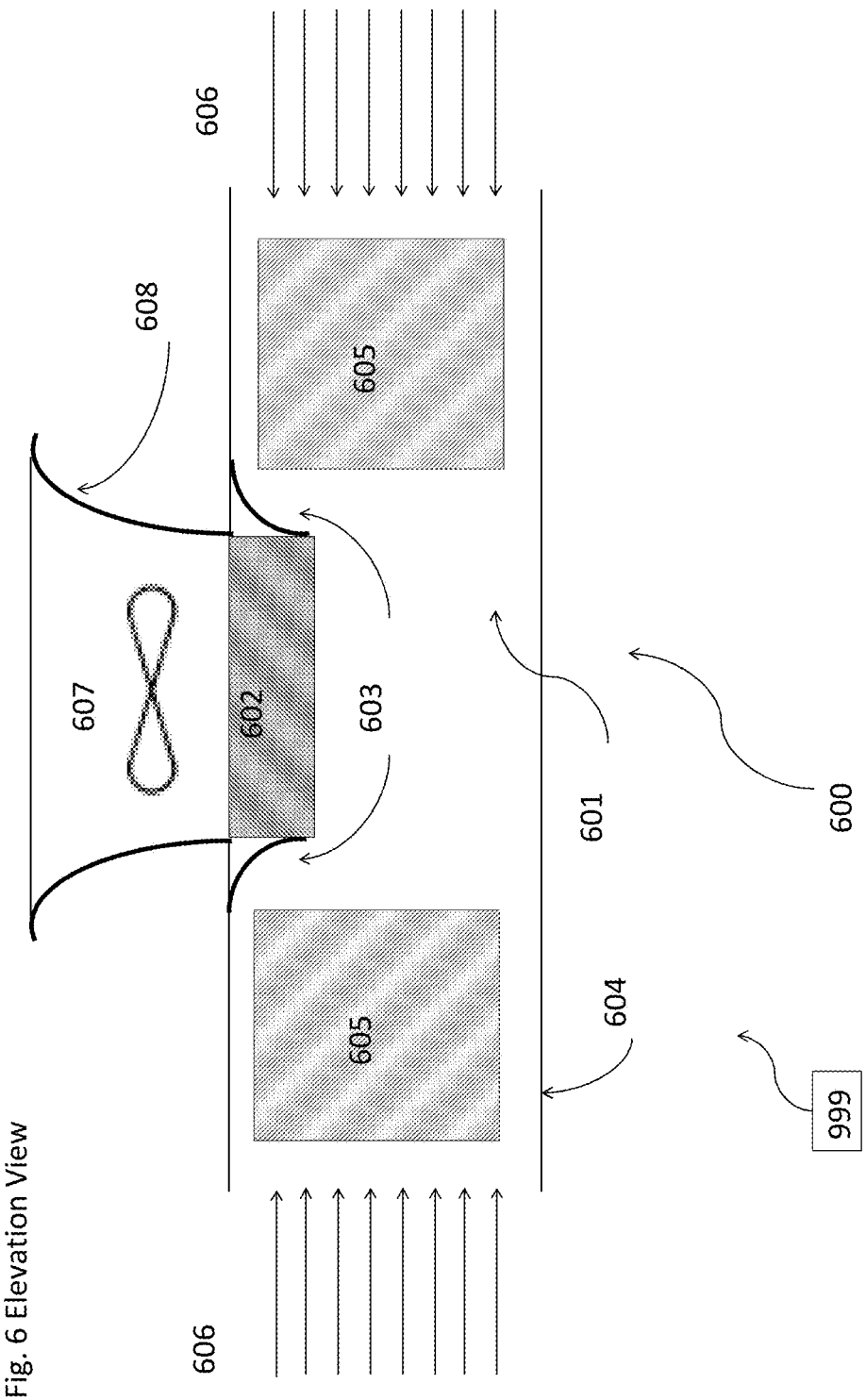
FIG. 6 depicts an illustrative elevation view of an embodiment of a drift eliminator and sealant configuration fitted in front of the fan cowling of a liquid-gas contactor system.
Figure 7:
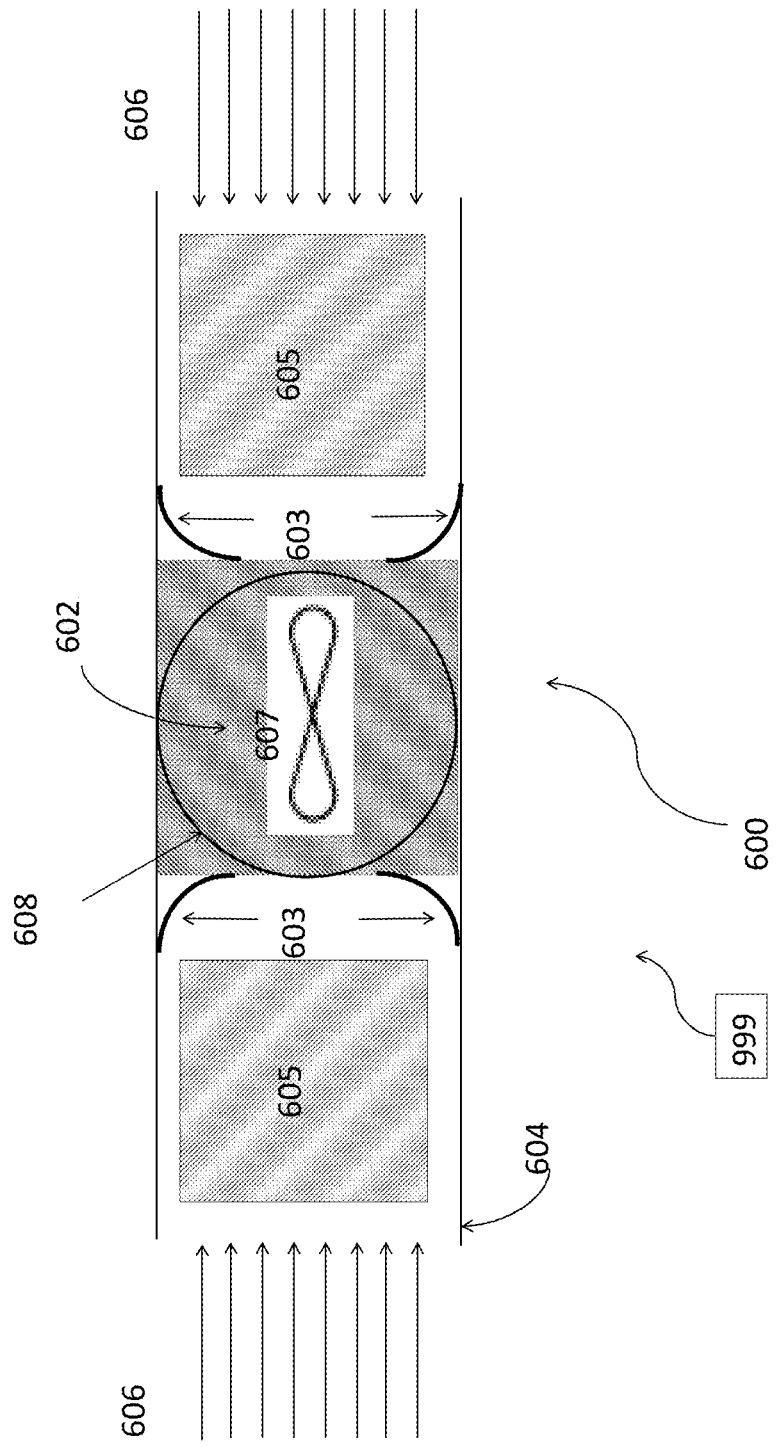
FIG. 7 depicts an illustrative plan view of an embodiment of a drift eliminator and sealant configuration fitted in front of a fan cowling of a liquid-gas contactor system.

Referring to FIGS. 6 and 7 (showing elevation and plan views, respectively), installing and sealing the drift eliminator material is described with respect to illustrative gas contactor system 600. The system described herein may include an induced fan 607 coupled to drift eliminator material 602 and structural housing 604 as well as sealant 603. The structural housing may be coupled to one or more areas of packing material 605, an open plenum area 601 and a fan cowling outlet 608. The system described is shown as an induced flow dual cell cross flow gas contactor. In this configuration, the fan 607 is located downwind of the packing and drift material, and it functions to pull airflow 606 into the system, through the packing material 605 and through the drift eliminator material 602 before leaving via the fan cowling outlet 608. In some applications, the system could also be an induced flow single cell gas contactor. The drift eliminator material 602 is installed immediately below the fan cowling 608 and the edges of the drift eliminator material are sealed against the structure/housing 604. The sealant 603 may be constructed of a flexible and air tight material, and will be chemically compatible and inert in regards to the process solution. The sealant may include but is not limited to materials such as flexible flaps or strips, caulking or spray foam, and may be constructed from material that is compatible with caustic solutions including but not limited to potassium or sodium hydroxide. This configuration ensures substantially no air gaps or cracks, so that all gas/liquid flow in the open plenum area 601 cannot be sucked out of the system by the fan without passing through the drift eliminator material. Induced fan configurations are also desirable, as while they are operating, they create a pressure gradient where the outside pressure is greater than the system pressure, so that gas leaks into the system rather than out of the system.

Figure 8:
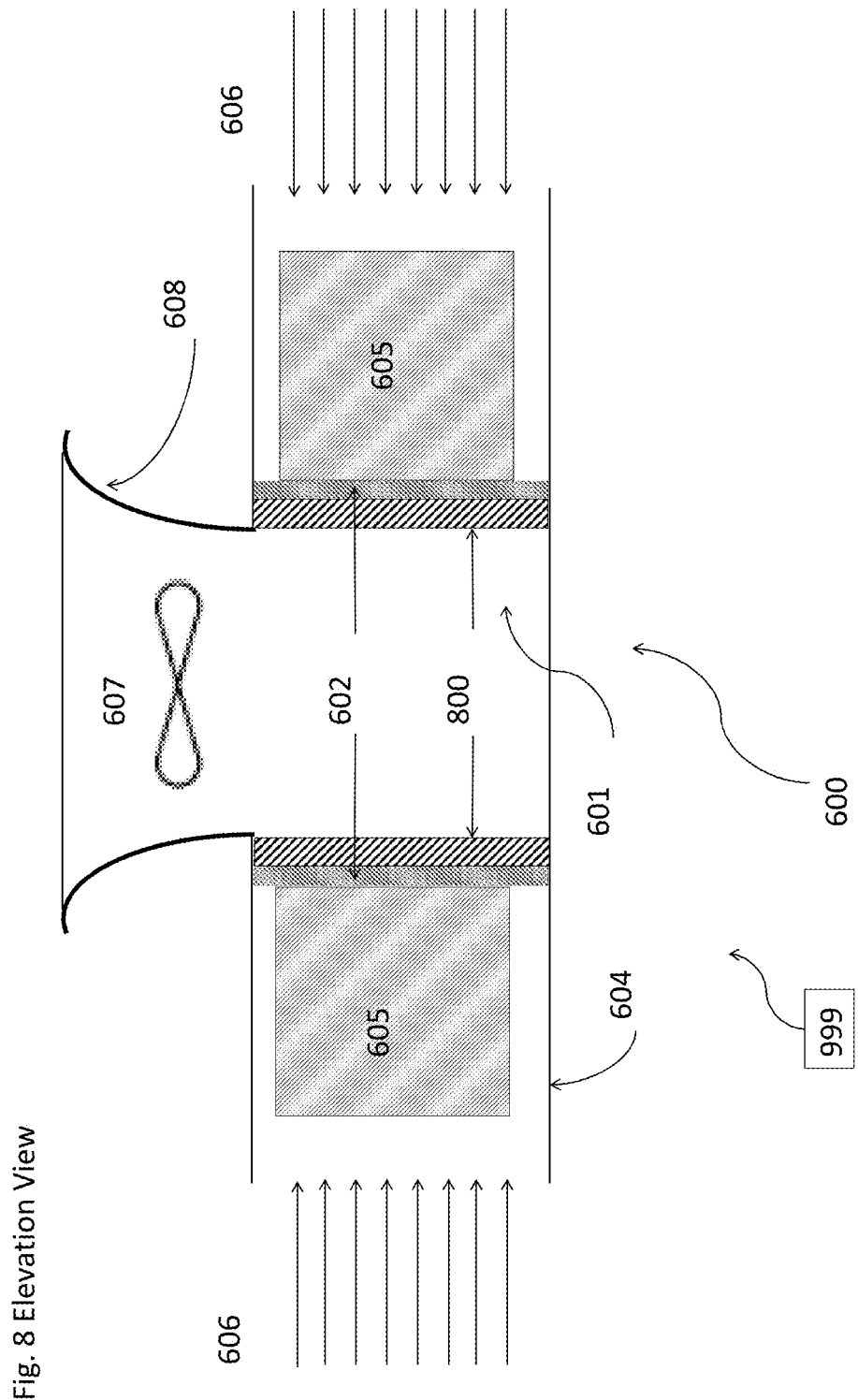
FIG. 8 depicts an illustrative elevation view of an embodiment of a drift eliminator and sealant configuration fitted between the packing material, overall housing and fan plenum area of a liquid-gas contactor system.
Figure 9:
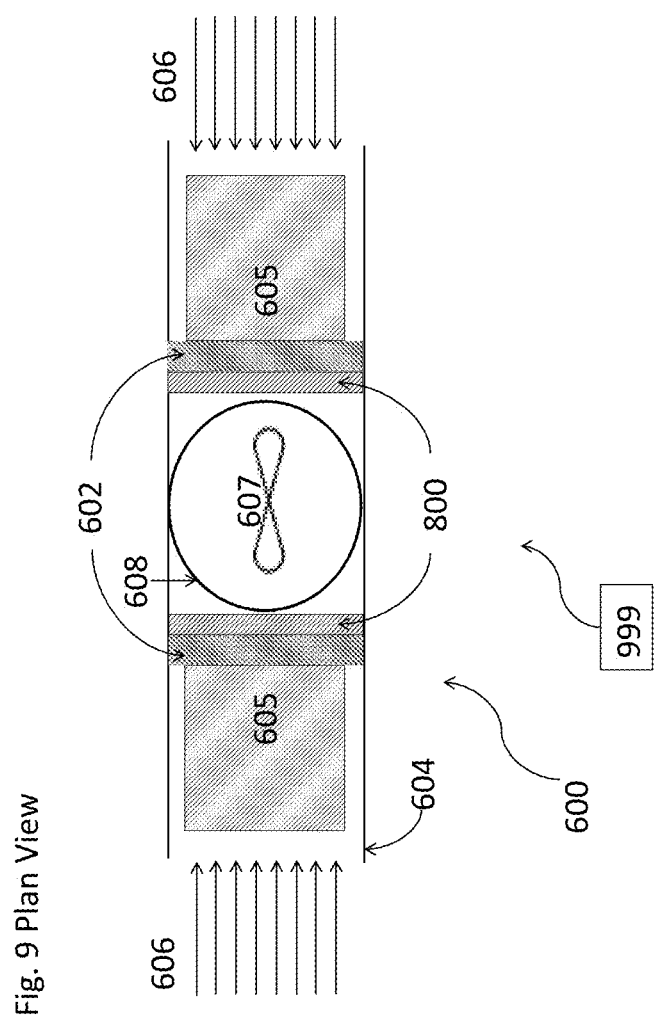
FIG. 9 depicts an illustrative plan view of an embodiment of a drift eliminator and sealant configuration fitted between the packing material, overall housing and fan plenum area of a liquid-gas contactor system.

Referring to FIGS. 8 and 9 (showing elevation and plan views, respectively), installing and sealing drift eliminator material is described with respect to illustrative gas contactor system 600. The system described herein may include a fan cowling 608 coupled to an induced fan 607 and a structural housing 604. The structural housing 604 may be coupled to one or more sections of packing material 605, drift eliminator material 602 and sealant 800. The structural housing 604 may also be coupled to an open plenum area 601. The system described is shown as an induced flow dual cell cross flow gas contactor. In this configuration, the fan 607 is located downwind of the packing and drift material, and it functions to pull airflow 606 into the system, through the packing material 605 and through the drift eliminator material 602 before leaving via the fan cowling outlet 608. In some applications, the system could also be an induced flow single cell gas contactor. The drift eliminator material, 602, is installed immediately downwind of the packing material, 605, and in some cases could be physically attached to the packing material. The edges of the drift eliminator material 602 are sealed against the structure/housing 604 using a sealant, 800 such that there are substantially no air gaps or cracks. The sealant, 800, may be constructed of a flexible and air tight material, and will be chemically compatible and inert in regards to the process solution. Induced fan configurations such as this one are also desirable, as while they are operating, they create a pressure gradient where the outside pressure is greater than the system pressure, so that gas leaks into the system rather than out of the system.

In the embodiments described above and illustrated in FIGS. 4 through 9, the notion of substantially no air gaps or cracks can mean that between 0-1% of the total outlet surface area is not directly covered by drift eliminator material. The outlet surface area is the area through which the gas being drawn through the liquid-gas contactors must move in order to exit the system, and may be located downstream of the packing material. As shown in FIGS. 4 through 9, the outlet surface area may include but is not limited to the area immediately adjacent to the packing material 605, the surface area immediately upstream of the fan 607 and cowling 608, and the area downstream of the packing 605 but upstream of the plenum 601.

Figure 10:
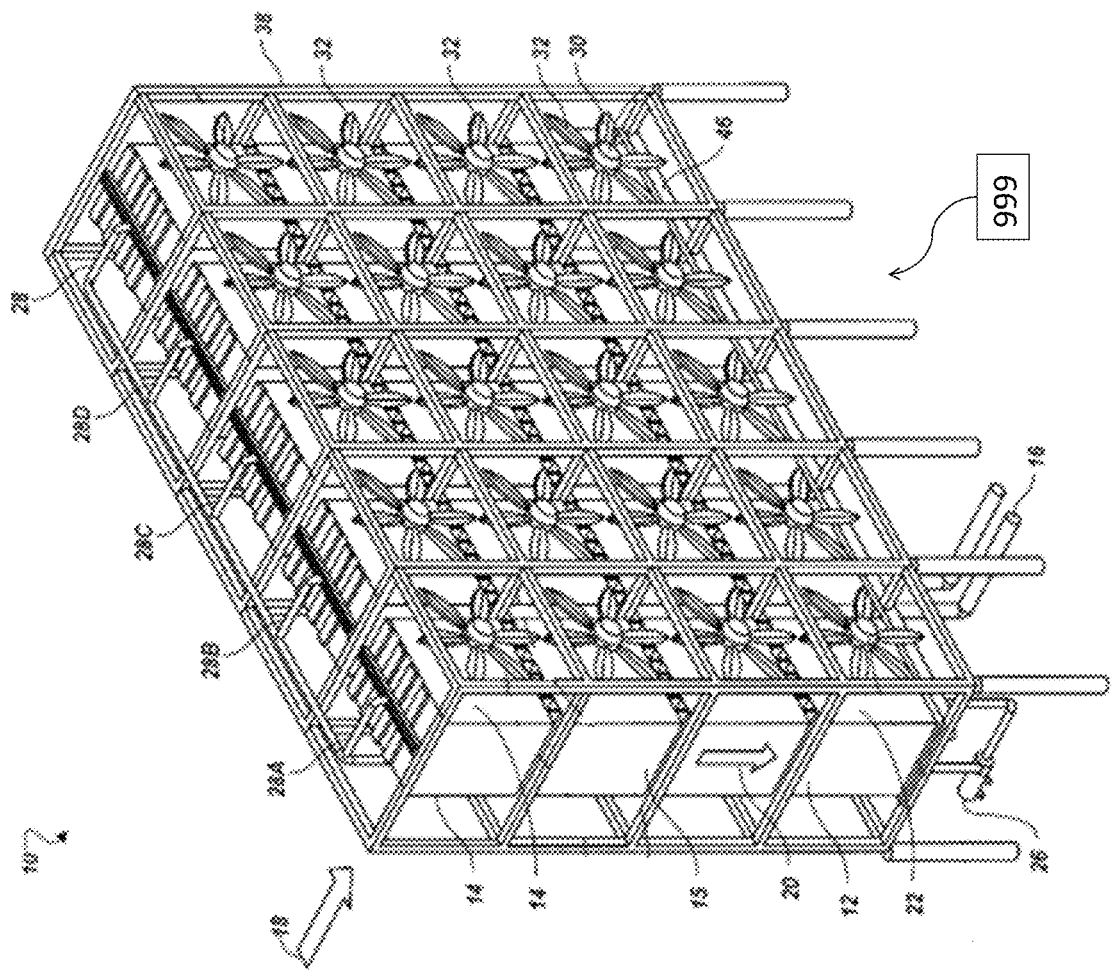
FIG. 10 depicts an illustrative view of a liquid-gas contactor slab configuration.

Referring to FIG. 10, a carbon dioxide capture facility 10 is illustrated comprising packing 12 formed as a slab 15, the slab 15 having opposed dominant faces 14, the opposed dominant faces 14 being at least partially wind penetrable to allow wind to flow through the packing 12. At least one liquid source 16 is oriented to direct carbon dioxide absorbent liquid into the packing 12 to flow through the slab 15. The slab 15 is disposed in a wind flow 18 that has a non-zero incident angle with one of the opposed dominant faces 14. The packing 12 may be oriented to direct the flow of carbon dioxide absorbent liquid through the slab 15 in a mean flow direction 20 that is parallel to a plane 22 defined by the opposed dominant faces 14. It should be understood that opposed dominant faces 14 don't have to be exactly parallel.

In one embodiment, the faces 14 may be converging, diverging, or curved for example. Packing 12 may be oriented to allow the carbon dioxide liquid absorbent to flow through the packing 12 by gravity. In some embodiments, packing dimensions can be about 200 m× about 20 m by about 3 m contained in a structure measuring about 25 m×7 m. In some embodiments, dimensions can range from about 10 m× about 7 m× about 2 m to about 1000 m× about 50 m× about 15 m.

Referring to FIG. 10, the non-zero incident angle refers to the fact that wind flow 18 strikes the face 14 at an angle greater than zero. This may be contrasted with traditional packing arrangements, where gas is flowed through a tower of packing starting from the very bottom. In some embodiments, the non-zero incident angle is orthogonal with the one of the opposed dominant faces. It should be understood that the non-zero incident angle may be within 10% of exactly orthogonal. The non-zero incident angle may also refer to the mean angle of flow of the wind. The mean angle of flow of the wind may be averaged over a period of time.

Referring to FIG. 10, the opposed dominant faces 14 may be oriented vertical. The orientation of faces 14 may be determined relative to, for example, the ground. In other embodiments, faces 14 may be oriented at an angle to the ground, e.g., slanted.

In another embodiment, the opposed dominant faces 14 may be oriented horizontal (not shown). This embodiment tends to have a larger footprint than the vertical slab embodiment.

Referring to FIG. 10, the at least one liquid source 16 may further comprise at least one pump 26. Pump 26 may have several distribution pipes 28, controlled by a valve (not shown), in order to selectively apply liquid into various sections of packing 12. In some aspects, the distribution pipes 28 may apply liquid into various top basin and nozzles systems instead of directly to the various sections of packing. The at least one pump 26 may be configured to supply the carbon dioxide absorbent liquid in a series and combinations of flush flows, low or no flows, and pulses. In some embodiments, the use of pump 26 and several distribution pipes 28 to apply liquid into various sections of packing is done to ensure that the same duty cycle is applied to any or all given sections or packing within the air contactor system.

Referring to FIG. 10, at least one fan 30 may be oriented to influence wind flow through at least a section of one of the opposed dominant faces 14 of the packing 12. Fan 30 may be reversible. In some embodiments, fan 30 may prevent the wind flow that has already flowed through the packing 12 from circulating back into the packing 12.

Referring to FIG. 10, the at least one fan 30 may further comprise plural fans, each of the plural fans being oriented to influence wind flow through at least a respective portion of the packing 12. In some embodiments, the respective portion is understood as being the portion of the packing 12 that air flow through fan 30 would have the greatest influence over, for example the packing 12 most adjacent or closest to fan 30. The at least one fan 30 may be provided as part of a fan wall 32 adjacent at least one of the opposed dominant faces 14. It should be understood that fan walls (not shown) may be located adjacent each of faces 14. Adjacent, in this document, is understood to mean next to, and can include embodiments where the fan wall 32 is spaced from, but adjacent to, face 14. Referring to FIG. 10, the fan wall 32 may be adjacent the one of the opposed dominant faces 14 through which the wind flow 18 is exiting the packing 12. In fan wall 32, the individual fans may be separated by impermeable material. The fans 30 create a pressure drop across the wall 32, which drives flow through the packing 12. In some embodiments, fan wall 32 is designed such that, in the event that a fan fails, and ultimately blocks of its respective flow, flow through the packing 12 would be almost, if not completely, unaffected. This may be accomplished by closely spacing adjacent fans, and by spacing the fan wall 32 from the packing 12, for example.

Referring to FIG. 10, a sink 46 may be provided for collecting carbon dioxide absorbent liquid that has flowed through the packing 12. In some aspects, the sink 46 may be, for example a concrete-lined basin that catches the hydroxide and contains supports to hold the packing. In some embodiments, there may be a gap between the packing 12 and the sink 46 that can be −1 to 1.5 m for example. In some embodiments (not shown), sink 46 may be a pipe or a series of conduits for example, that transport the liquid directly from packing 12. This type of system may involve a funneling or drainage apparatus designed to focus the drainage of the liquid into a single, or a network of pipes. The contacted liquid may then be recirculated through the packing, or it may be recycled and then recirculated. In some embodiments, facility 10 further comprises a recycling system (not shown) for regenerating spent carbon dioxide absorbent liquid. The recycling system may be, for example, any of the systems for recycling spent carbon dioxide liquid absorbent. The carbon dioxide absorbent liquid may comprise a hydroxide solution, for example a sodium hydroxide solution. The source of liquid 16 preferably supplies recycled carbon dioxide absorbent liquid.

Referring to FIG. 10, the step of applying may further comprise applying the carbon dioxide absorbing liquid into at least one of a top distribution nozzle and basin system (not shown) and/or a first portion of packing 12 in a first series of flow rates, for example flushes and/or pulses, and applying the carbon dioxide absorbing liquid into another top distribution nozzle and basin system and/or a second portion of packing 12 in a second series of flow rates, for example flushes and/or pulses. This may be envisioned by selectively applying liquid via distribution tubes 28A and 28B to at least one of a top distribution nozzle and basin system and/or a portion of packing 12. Because tubes 28A and 28B only feed a portion (e.g., the left-most portion) of at least one of a top distribution nozzle and basin system and/or packing 12, only that nozzle and basin system and/or portion or packing will have liquid applied to it. Liquid may then be selectively applied to the right hand of at least one of a top distribution basin system and/or portion packing 12 by applying liquid via tubes 28C and 28D. The first and second series of flow rates may be synchronized, asynchronized, completely different, or synchronized out of phase with one another, for example, allowing fluids to be supplied intermittently from a continuously operating pump and valve system.

Referring to FIG. 10, the packing may be oriented to flow the carbon dioxide absorbing liquid through the packing 12 in a mean liquid flow direction 20. Flowing may further comprise flowing the gas through the packing 12 obliquely or perpendicularly to the mean liquid flow direction 20. This is advantageous as the flow of gas may have a different flow direction than, and one that is not counter current to, the mean liquid flow direction 20 of the liquid. Thus, a larger surface area of the packing may be used to full advantage, greatly increasing the quantity of wind or gas that may contact liquid in packing 12 over a course of time while still allowing the liquid to pass through and drain from packing 12.

In these embodiments, a slab is not entirely necessary, in fact other shapes of packing 12 are envisioned, including but not limited to a cube, a cylindrical, and other various shapes. Referring to FIG. 10, in some embodiments flowing the gas further comprises flowing the gas through the packing 12 perpendicularly to the mean liquid flow direction 20. It should be understood that exact perpendicularity is not a requirement. Flowing may further comprise flowing the gas through at least one of the opposed dominant faces 14, for example through both of faces 14 as indicated.

As disclosed above, these methods may involve recycling the carbon dioxide absorbing liquid. The methods may involve influencing the flowing of the gas through the packing. Influencing may comprise, for example, preventing the gas that has already flowed through the packing 12 from circulating back into the packing 12. Influencing may further comprise driving the flowing of the gas in a drive direction that is at least partially oriented with an ambient wind flow direction. This may be carried out using fans 30, which may be reversible in order to carry out this function. Further, these methods may involve directing the flow of gas at least one of into and out of the packing, using, for example louvers.

Referring to FIG. 10, in some embodiments, fans 30 may be reversible in order to enable the flow to be driven in the direction of the ambient wind field, which is more efficient than inducing a flow that is counter to the prevailing wind direction. In some aspects, the orientation of slabs 15 may be such that prevailing wind 18 is perpendicular to the slab 15, and is in the direction at which the fan wall (not shown) works most efficiently. The packing design may use vertically oriented plates. This would be a modification of conventional structured packing designed to enable, for example, orthogonal liquid and gas flow directions. Packing may be for intermittent fluid flow so as to maximize the hold up of liquid absorbent inside the packing material.

Referring to FIG. 10, as disclosed above, the fan wall 32 may be sectionalized, so that flow speed can be reduced or stopped when fluid is flowing to minimize fluid loss. The sections may be operated asynchronously so that only one section at a time is receiving the fluid flow enabling fluid pumps to operate continuously. For example, if fluid flow was needed for 100 seconds out of 1000 one may have 11 sections and would direct the fluid into one of them at a time.

Referring to FIG. 10, another method of carbon dioxide capture is illustrated. Carbon dioxide absorbing liquid is flowed through packing 12 in a mean liquid flow direction 20, a gas containing carbon dioxide is flowed through the packing 12 obliquely or perpendicularly to the mean liquid flow direction 20 to at least partially absorb the carbon dioxide from the gas into the carbon dioxide absorbing liquid. Flowing carbon dioxide absorbing liquid through packing 12 may further comprise applying the carbon dioxide absorbing liquid into the packing 12 in a series of pulses. Flowing the gas further may comprise flowing the gas through the packing 12 perpendicularly to the mean liquid flow direction 20.

A method of contacting a liquid with a gas is also disclosed comprising applying the liquid into packing 12 in a series of pulses and flowing the gas through the packing 12.

Referring to FIG. 10, a gas-liquid contactor (illustrated by facility 10) is also disclosed. Referring to FIG. 10, the contactor (illustrated as facility 10) comprises packing 12 formed as a slab 15, the slab 15 having opposed dominant faces 14, the opposed dominant faces 14 being at least partially wind penetrable to allow wind to flow through the packing 12. At least one liquid source 16 is oriented to direct the liquid into the packing 12 to flow through the slab 15. The slab is disposed in a wind flow 18 that has a non-zero incident angle with one of the opposed dominant faces 14. Similar to the gas-liquid contactor and the above described method, this method may be applied to any gas-liquid contactor. It should be understood that this gas-liquid contactor may have all of the same characteristics as the carbon dioxide capture facility and contactor disclosed herein.

Referring to FIG. 10, a gas-liquid contactor (illustrated by facility 10) is also disclosed, comprising a slab 15 structure comprising packing 12 and a liquid source 16 oriented to direct the liquid into the packing 12 to flow in a mean liquid flow direction 20. The slab structure is disposed in a wind flow 18 that flows obliquely or perpendicularly to the mean liquid flow direction 20.

Referring to FIG. 10, a method of contacting a liquid with a moving gas (illustrated as wind flow 18) is disclosed. The method comprises flowing the liquid through packing 12, and driving the moving gas through the packing 12 in a drive direction (which is the same as wind direction 18 in this embodiment) that is at least partially oriented with an ambient flow direction 18 of the moving gas. In the embodiment shown, the flowing gas is wind, and the ambient flow direction is the ambient wind direction 18. This method may further comprise reversing the drive direction when the ambient flow direction 18 reverses. Reversing the fan direction (or more generally, reversing the forced flow of air through the packing) in such a way as to drive the air with a vector direction that is at least partially oriented with the ambient wind 18 reduces the required fan power. Further, this reduces the amount of low-C02 air that is recycled back into the inlet of the system, thus improving its efficiency. It is thus advantageous to align the packing such that one of opposed dominant face 14 is roughly perpendicular to the prevailing wind, in order to maximize the efficiency of the fans. In this document, wind flow is understood as moving gas containing $CO_2$.

Figure 11:
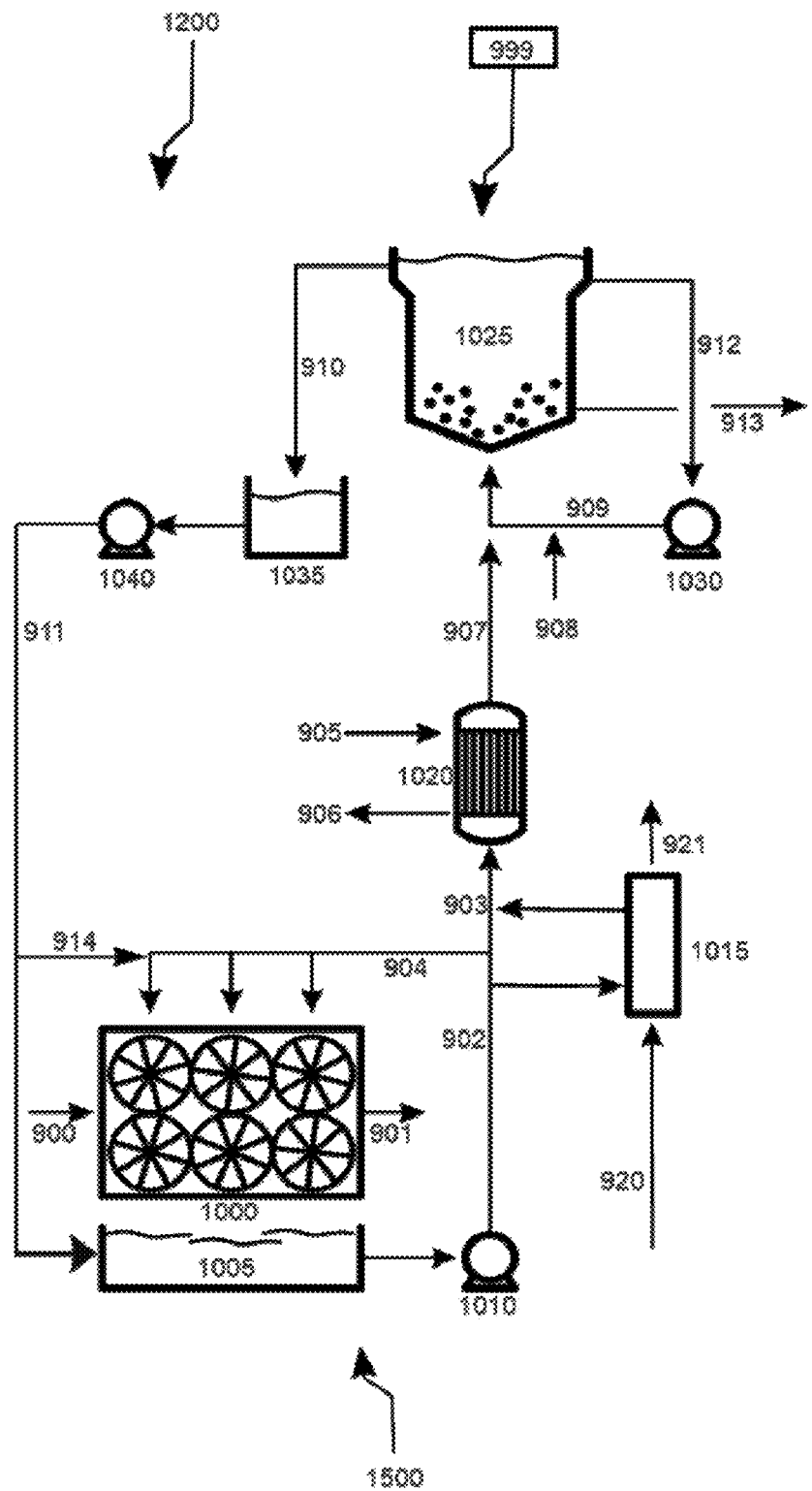
FIG. 11 depicts an illustrative system for capturing carbon dioxide from dilute sources, including a liquid-gas contactor system.

Referring to FIG. 11, an air contactor system 1500 including one or more of the features described in FIGS. 1 through 10, is described with respect to illustrative a Direct Air Capture process 1200. In some embodiments, a Direct Air Capture process includes but is not limited to a causticization system 1025, a calcining system (not shown), a slaking system (not shown) and an air contactor system 1500. FIG. 11 does not show all the systems and equipment involved in a direct air capture process, rather, it illustrates one embodiment of how the key interfaces, for example heat and material stream exchanges, could be set up between an air contactor system 1500 and the immediate upstream and downstream process and heat exchange equipment of a direct air capture process. In some aspects the direct air capture process may include a control system 999 coupled to the components (illustrated or otherwise).

In some embodiments, the capture solution may be composed of potassium hydroxide and potassium carbonate in water. In some aspects, the solution circulates internal to the air contactors to keep a wetted film replenished on fill media known as structured packing. As this solution reacts with carbon dioxide, the hydroxide is depleted as carbonate is produced. To keep the solution composition at desired concentration, a carbonate-rich bleed stream can be removed from the air contactor lower basin and sent downstream, for example to a causticization system including but not limited to equipment such as a fluidized bed reactive crystallizer, (also known as a pellet reactor), while a carbonate-lean, hydroxide-rich return stream carries solution from the downstream causticization system back to the air contactor system.

Referring to FIG. 11, stream 900 represents inlet atmospheric airflow into the air contactor. Stream 901 represents outlet carbon dioxide-depleted air. Stream 904 represents the potassium hydroxide aqueous solution delivered to the packing structure of the air contactor. In some aspects, the potassium hydroxide aqueous solution is delivered through use of a top basin and nozzle system as described in FIG. 1. In other aspects, the liquid may be distributed using a distribution header system, including pressurized piping and nozzles.

In some embodiments, stream 904 is a pulsed flow, cycling the flow of caustic solution intermittently to the top of the air contactor instead of supplying it continuously. In some aspects, wetting of the packing is maintained at low average flow rates by alternating short-periods of high-flow rates that wet the packing and remove dust and debris, and low flow rates that replenish the wetted surface.

In some embodiments, stream 911 could be re-circulated potassium hydroxide solution that is fed back to the air contactor system 1500, for example to the basin 1005, or to the top of the packing structure 1000 via stream 914, after processing in the downstream causticization system 1025, which could include for example a causticizer or pellet reactor. The re-circulated solution stream 911 may include a small quantity of calcium carbonate fines from the causticization system 1025, which may be filtered out of the stream 910 using for example at least one of an inline fines filter (not shown) fluidly coupled to stream 910. In another aspect, these solids may settle out in the basin 1005 of the air contactor system, where for example the basin 1005 could include solids removal features including but not limited to those described in FIG. 3. The solution from stream 910 may temporarily be stored a tank 1035 before being transferred by pump 1040 as stream 911 to air contactor system 1500.

In some embodiments, carbon dioxide-rich solution is extracted from the air contactor basin 1005 through a pump 1010 as stream 902. A portion of this hydroxide-based stream 904 is re-circulated to continue carbon dioxide capture in the air contactor unit 1005.

In some embodiments, during the process of capturing carbon dioxide, the air contactor 1000 may also evaporate water to the atmosphere, causing evaporative cooling which reduces the temperature of the rich solution stream 902 leaving the contactor. This cooled solution 903 may then be sent to a heat exchanger 1010 where it cools streams of water 905, 906 that can be used to cool other plant equipment as required.

In some embodiments, after the rich solution 907 has passed through the heat exchanger 1020 and is warmed back to approximately 20° C., a small stream (not shown) may be drawn off for disposal to manage the build-up of non-process elements ingested by the contactor.

These non-process elements may include for example, dust, pollen, other particulates, and ions produced by the reaction of the hydroxide with other acid gases present in the air.

The flow rate of hydroxide-based stream 904 is set by the needs of the packing material in the air contactor 1000 to ensure an optimum amount of wetted surface area for capturing the carbon dioxide from the incoming air. The optimum point is determined by a balance of what is required for the reaction kinetics as well as what is required to wet the packing surface.

In some embodiments, the causticization system 1025 receives the carbon dioxide-rich solution stream 907, which may contain for example aqueous potassium hydroxide and potassium carbonate, from the air contactor unit 1000. In some aspects, the causticization system 1025 receives a controlled amount of concentrated calcium hydroxide slurry (hydrated lime slurry) by way of stream 908 from a slaker system (not shown). These two streams 907 and 908 feed into the causticization system 1025. In some cases, where the causticization system 1025 includes for example a fluidized bed reactive crystallizer, the two streams 907 and 908 may combine with a recirculation stream 909 before re-entering the causticization system 1025. The causticization reaction takes place in the causticization system, reacting calcium and hydroxide ions with potassium and carbonate ions to produce aqueous potassium hydroxide and solid calcium carbonate.

In some embodiments, the effluent fluid containing fines leaves the causticization system 1025 as stream 910, and discharges back to the air contactor system as stream 911. In some aspects, the causticization system 1025 may include for example a pellet reactor unit, and the pellet reactor unit may have a recirculation stream 912 which leaves from the top portion of the pellet reactor and is then pumped back into the pellet reactor as stream 909 by way of pump 1030. In some aspects the recirculation stream 912 provides at least a portion of the fluidization flow needed to fluidize the pellet bed.

In some aspects of a DAC facility 1200, for example where the causticization system includes a pellet reactor, a mixture of mostly mature pellets from the pellet reactor unit may be discharged as a slurry of pellets in stream 913, and sent to a separation unit (not shown) and a washing unit (not shown).

In some embodiments, the air contactor design may include for example a "structured packing" material that distributes the carbon dioxide-absorbing solution over a large surface area, and creates efficient contact with the air by minimizing frictional air resistance (pressure drop), in the flow channels. In some aspects, the large liquid surface area is essential in order to absorb a large fraction of carbon dioxide from the air, and the low-pressure drop is required to minimize the fan energy requirements at high air throughputs.

In some aspects, the term "structured packing" may include a bulk fill material. In some aspects the term "structured packing" may include material that is composed for example of crimped or pressed sheets, and made for example from steel or plastic componentry that may be assembled to form a multitude of gas flow channels. In some aspects, the structured packing is designed to disperse liquid that is supplied from overhead through use of distribution componentry. In some aspects, the distribution componentry may include a basin and nozzle system, or a distribution of pipes, valves and nozzles In some embodiments, the air contactor system may include PVC-based packing products from the cooling tower industry, which could be selected based on, for example, cost-effectiveness, chemical compatibility with hydroxide, high surface area, long lifetime, debris management, and low pressure drop.

In some embodiments, using PVC instead of stainless steel material in the air contactor design could offer dramatic cost savings for a large-scale air contactor. Moreover, in some aspects, plastic packing offers wetting comparable to steel packing for strong hydroxide, and the performance of plastic cooling tower packing typically exceeds that of steel cooling tower packing in pressure drop per unit of surface area.

In some embodiments, cooling tower packing material similar to Brentwood Industries XF12560 structured packing, a commercially available product specifically designed for use in large cross-flow cooling tower applications, may be used in the air contactor design. Brentwood XF12560 is constructed from PVC that is completely resistant to strong hydroxide, has an efficient cross-flow geometry which produces low air-side pressure drop, and possesses a similar surface area per volume ($210 \ m^2/m^3$) as common stainless steel tower packing, such as Sulzer 250X.

In some embodiments, replenishment of the capture solution that forms a film on the walls of the air flow channels within the packing of the air contactor system is accomplished simply by pumping liquid to the top of the air contactor and distributing it over top of the packing banks. In some aspects, this could involve the use of distribution pipes and nozzles. In some aspects this could involve variations of the top basin and nozzle design described herein and illustrated in FIG. 1. In some aspects, simple arrangements of pipes, pumps, and control valves, allow the liquid flow to be controlled to the top of the air contactor, and to any variation of distribution system that is fluidly coupled to the top of the air contactor.

In some embodiments, minimizing the energy required to operate the gas-liquid contactor can be a critical factor in the design. In some aspects where the air contactor is used to capture $CO_2$, for example from dilute sources such as atmosphere, the design of the air contactor system can involve a trade-off between generating sufficient air throughput for carbon dioxide capture, and minimizing capital and operating costs to maintain the economic viability and environmental sustainability of the process. Air contactor designs for applications such as carbon capture from dilute sources can be a product of balancing the operating costs of fan and liquid pumping energy requirements to generate sufficient air throughput and carbon dioxide capture—while minimizing the capital expenditure per unit of carbon dioxide captured and overall carbon intensity of the process itself.

In some embodiments where the gas contactor is used to capture $CO_2$ from dilute sources such as atmosphere, the air contactor design can require between approximately 4 to 9 meters of air travel depth for optimum performance. The air travel depth refers to the linear distance of packing material through which the air flows and interfaces with the liquid solution. In comparison to short air travel/packing depths of up to approximately 1 meter, for example those used in cooling tower applications, longer air travel depths may produce larger pressure drops for a given liquid flow, air velocity and packing material. The larger pressure drop can result in the need for more powerful fan designs and higher energy use, in particular if continuous high liquid flow rates were to be used to meet the vendor wetting requirements of the packing material.

Given the nature of carbon capture applications, e.g., the main objective being to reduce carbon intensity with an economically viable process/design, there is strong incentive to find ways to minimize energy usage, while maintaining attractive capital expenditure per unit of carbon dioxide captured and low overall carbon intensity.

In some embodiments, the use of variable liquid flow in a gas-liquid contactor allows for energy savings in both the air fan and liquid pump operations. For example, liquid can be supplied to the packing material in periods of high liquid-flow rates to fully flush the entire packing surface, and subsequent periods of low or zero flow rates to conserve pumping energy while allowing the hydroxide solution to partly react away while capturing carbon dioxide. This method of operation can minimize the pressure drop of the packing material by avoiding air-channel constriction with high liquid flows, while also minimizing pumping energy requirements.

One way of supporting a variable flow rate mode of operation is through use of the nozzle and basin features described herein. The nozzle basin feature allows for consistent liquid spatial distribution throughout the range of flow rates so that the packing material is evenly wetted, resulting in a greater portion of the packing material participating in the $CO_2$ capture process throughout the range of liquid flow rates.

The economic benefits of reducing overall energy requirements as described above may be applied to other gas contacting systems, and as such the use of variable flow rates and the nozzle basin features described here could be useful in other applications, for example cooling tower applications as well as carbon capture from point sources.

In some embodiments, the air contactor system is used to capture carbon dioxide directly from air, where it exists at the low concentration of approximately 400 ppm. The bulk air processing requirements for this imply that traditional packed scrubber column technology is poorly suited to the task. Rather, designs that are more similar to, for example, industrial cross-flow cooling towers, having more cost-effective structural designs and larger inlet areas, could provide a more appropriate design basis.

In some embodiments, the use of air contactor designs that resemble large, cross-flow cooling tower structures instead of a packed tower configuration allows for significantly lower cost per enclosed packing volume.

In some embodiments, by applying construction materials and methodologies similar to those applied in the cooling tower industry to the air contactor design, a reduction in the structure cost per inlet area could be realized.

In some embodiments, the air contactor structure itself has inlet area dimensions determined by the required capture rate of carbon dioxide and the density of carbon dioxide in air, and has depth determined within the overall optimization. In some aspects, the air contactor structure itself could utilize a combination of fibreglass reinforced plastic and steel materials to create the support structure. In some embodiments, particularly larger scale applications, liquid distribution systems are contained within the support structure, packing banks are supported over liquid collection basins, and air flow is managed with cowlings and baffles.

In some larger commercial plants, the air contactor system could include for example multiple air contactor modules fluidly coupled to each other.

In some embodiments, the air contactor support structures could be fabricated and constructed using common cooling tower components and methods, in addition to the features described in FIGS. 1 through 10.

In some embodiments, the packed air travel depth, the horizontal distance between the inlet and outlet of the structured packing through which the air travels, and optimal air velocity for the air contactor, may be determined based on a trade-off between capital and operating expenses. In some aspects, the air contactor design is a product of balancing the operating costs of the fan(s) and liquid pumping energy requirements to generate sufficient air throughput—and thus carbon dioxide capture—while minimizing the capital expenditure per unit of carbon dioxide captured.

Operation of the air contactor design should take into account the principal environmental health and safety risks. Some examples of health and safety risks could include for example, loss of corrosive hydroxide solution through liquid spills, and through inclusion in the outlet air stream, known as drift. Liquid spills can be mitigated with standard containment designs and adherence to occupational health, safety, and environmental regulations. Drift is a term used in the cooling tower field to denote fine aerosol particles that are generated by liquid movement within the system. The loss of hydroxide through drift can be a risk associated with air contactor operation.

The cooling tower field has a well-developed method for drift elimination: commercial drift eliminators. Drift eliminators also known as demisters, are very similar to structured packing: they force the air through a tortuous flow path, such that in making multiple bends, any fine droplets entrained in the flow are strained out by the walls and drain back into the system.

There are various types of drift eliminators commercially available. Drift eliminators can be integrated with the packing material of the air contactor design. For example, a Brentwood Industries XF80Max stock demister product, assures drift losses below 0.0005% of the full fluid recirculation rate, even under high liquid flow conditions used in cooling towers. At this performance level, commercially available drift eliminators are able to control drift in the air that passes through them at levels far below the regulated health and safety standards. In some aspects, for example in cooling tower system installations where components such as drift eliminators may be installed and sealed in the field, air bypass of the drift eliminator material can arise as a result of, for example, the field installation methods or environment introducing cracks or gaps around the drift eliminator material. For example the drift eliminator material might be cut to fit around structural beams or componentry, or installation or sealing activities could take place in the field, outdoors, in inclement weather and by different installation teams. In some cases, these conditions may increase the likelihood of cracks or gaps formed between the packing, drift eliminator material and external structure, leading to some of the air containing liquid droplets (drift) moving around instead of through the drift eliminator material.

In some embodiments, the environmental, health and safety risks associated with hydroxide solution drift can be effectively managed with proper drift eliminator installation. In some aspects, the examples of drift eliminator design, fabrication and installation as described herein, and as shown in FIGS. 4 through 9, can enable lower drift levels for the overall air contactor system as these features work to prevent air from bypassing the drift eliminator material.

In some embodiments, operation of the air contactor design, requires tight control of the aerosol droplet losses, or drift, tighter than the control established for cooling tower designs, because the drift includes more than just water. For example, the drift may contain droplets of hydroxide solution, which would pose environmental, health, and safety risks that are different to and potentially more severe than drift of cooling water droplets. The 0.0005% performance rating of existing cooling tower drift eliminators suggests that they should be able to limit hydroxide drift losses to less than one-tenth of the NIOSH Recommended Exposure Limit, provided that they are designed, fabricated and properly installed to mitigate the risk of air or liquid bypassing the drift eliminator material.

In some embodiments, the air contactor unit may be fabricated using in-shop modular construction, where modules are fabricated pre-assembled and tested at the fabrication location before being shipped to the field. In some embodiments, air contactor componentry such as structural housing, packing, drift eliminators, that are designed for this type of modular fabrication will have overall cost savings, as there will be the potential to reduce field install activities and site labour.

A number of embodiments of the invention have been described. Nevertheless, it will be understood that various modifications may be made without departing from the spirit and scope of the invention. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A method of drift elimination in a liquid-gas contactor system comprising:
    configuring a pre-fabricated mechanical frame coupled to a drift eliminator material to produce a framed drift eliminator assembly with substantially no air gaps between the drift eliminator material and the pre-fabricated mechanical frame; and
    coupling the framed drift eliminator assembly to the liquid-gas contactor system.

2. The method of claim 1, wherein the framed drift eliminator assembly comprises a flexible sealant coupled to the drift eliminator material.

3. The method of claim 1, further comprising capturing $CO_2$ from at least one of a dilute source or a point source with the liquid-gas contactor system.

4. The method of claim 3, wherein the dilute source comprises air and the point source comprises one or more of flue gas, reservoir gas, exhaust flue stack gases from power generation processes, exhaust flue stack gases from concrete production processes, or exhaust from combustion processes.

5. The method of claim 1, further comprising operating the liquid-gas contactor system as part of a cooling water system.

6. The method of claim 2, further comprising:
    capturing $CO_2$ from at least one of a dilute source or a point source with the liquid-gas contactor system, where the dilute source comprises air and the point source comprises one or more of flue gas, reservoir gas, exhaust flue stack gases from power generation processes, exhaust flue stack gases from concrete production processes, or exhaust from combustion processes; and
    operating the liquid-gas contactor system as part of a cooling water system.

7. A liquid-gas contactor apparatus comprising:
    a drift eliminator assembly comprising:
        a pre-fabricated mechanical frame;
        a drift eliminator material coupled to the pre-fabricated mechanical frame to form a framed drift eliminator assembly; and
        a flexible sealant pressed against the drift eliminator material configured for substantially no air gaps;
    a packing material; and
    a fan positioned to circulate a gas stream through the packing material.

8. The apparatus of claim 7, wherein the liquid-gas contactor apparatus is configured for capturing $CO_2$ from one or more of a dilute source or a point source.

9. The apparatus of claim 8, wherein the dilute source comprises air and the point source comprises one or more of flue gas, reservoir gas, exhaust flue stack gases from power production equipment, exhaust flue stack gases from concrete production equipment, or exhaust from combustion equipment.

10. The apparatus of claim 7, wherein the liquid-gas contactor apparatus is configured as part of a cooling water system.

11. A liquid-gas contacting system, the system comprising:
    a packing material;
    a drift eliminator material;
    a fan positioned to circulate a gas stream through the packing material and the drift eliminator material;
    a liquid flowable through the packing material and configured to capture carbon dioxide ($CO_2$) from at least one of a dilute source or a point source; and
    a sealant positioned between the drift eliminator material and a housing, the sealant configured to minimize bypass of the gas stream between the drift eliminator material and the housing.

12. The liquid-gas contacting system of claim 11, wherein:
    the drift eliminator material is positioned between the packing material and the fan; and
    the fan comprises an induction fan.

13. The liquid-gas contacting system of claim 11 wherein the sealant comprises at least one of flexible flaps, flexible strips, caulking foam, and spray foam.

14. The liquid-gas contacting system of claim 11 further comprising:
a liquid inlet port coupled to a nozzle and basin system; and
a distribution sub-assembly coupled to the nozzle and basin system configured to operate under a plurality of liquid flow rates while maintaining consistent spatial liquid distribution, the distribution sub-assembly comprising:
a first portion of nozzles having a first intake height and a first nozzle design specific to a first flow rate; and
a second portion of nozzles having a second intake height shorter than the first intake height and a second nozzle design specific to a second flow rate that is less than the first flow rate.

15. The liquid-gas contacting system of claim 11 wherein the fan comprises a fan cowling, and the drift eliminator material is coupled to the fan cowling.

16. The liquid-gas contacting system of claim 15, wherein the packing material comprises a first section of packing material, the system further comprising a second section of packing material, and the drift eliminator material is positioned between the first and second sections of packing material and the fan.

17. The liquid-gas contacting system of claim 16, wherein the first section of packing material, the second section of packing material, the drift eliminator material, and the fan are configured to form a dual cell induced flow contactor.

18. The liquid-gas contacting system of claim 11 wherein the drift eliminator material is attached to the packing material.

19. The liquid-gas contacting system of claim 18, wherein the packing material comprises a first section of packing material and the drift eliminator material comprises a first section of drift eliminator material, the system further comprising:
a second section of packing material; and
a second section of drift eliminator material, wherein the first section of drift eliminator material is positioned between of the first section of packing material and the fan, and the second section of drift eliminator material is positioned between of the second section of packing material and the fan.

20. The liquid-gas contacting system of claim 19, wherein the second section of drift eliminator material is attached to the second section of packing material.

21. The liquid-gas contacting system of claim 11, wherein the dilute source comprises air.

22. The liquid-gas contacting system of claim 11, wherein the point source comprises one or more of flue gas, reservoir gas, exhaust flue stack gases from power production equipment, exhaust flue stack gases from concrete production equipment, or exhaust from combustion equipment.

* * * * *

UNITED STATES PATENT AND TRADEMARK OFFICE
CERTIFICATE OF CORRECTION

PATENT NO. : 11,014,043 B2
APPLICATION NO. : 16/514443
DATED : May 25, 2021
INVENTOR(S) : Kenton Robert Heidel et al.

Page 1 of 1

It is certified that error appears in the above-identified patent and that said Letters Patent is hereby corrected as shown below:

On the Title Page

Under item (56), Column 2, Other Publications, Line 2, delete "Authorty" and insert -- Authority --, therefore.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*